US009786089B2

(12) United States Patent
Morishita et al.

(10) Patent No.: US 9,786,089 B2
(45) Date of Patent: Oct. 10, 2017

(54) GRAPH DRAWING DEVICE AND GRAPH DRAWING METHOD

(71) Applicant: NEC Solution Innovators, Ltd., Koto-ku, Tokyo (JP)

(72) Inventors: Koji Morishita, Tokyo (JP); Katsuyuki Nagai, Tokyo (JP); Hisashi Noda, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 334 days.

(21) Appl. No.: 14/419,353

(22) PCT Filed: Mar. 28, 2013

(86) PCT No.: PCT/JP2013/002134
§ 371 (c)(1),
(2) Date: Feb. 3, 2015

(87) PCT Pub. No.: WO2014/027432
PCT Pub. Date: Feb. 20, 2014

(65) Prior Publication Data
US 2015/0221121 A1    Aug. 6, 2015

(30) Foreign Application Priority Data

Aug. 14, 2012    (JP) .................................. 2012-179698

(51) Int. Cl.
*G06T 15/00*    (2011.01)
*G08G 5/00*    (2006.01)
(Continued)

(52) U.S. Cl.
CPC .............. *G06T 15/00* (2013.01); *G01C 23/00* (2013.01); *G01S 13/91* (2013.01); *G06T 11/206* (2013.01);
(Continued)

(58) Field of Classification Search
CPC ..... G06T 15/00; G06T 11/206; G08G 5/0026; G08G 5/0013; G08G 5/0082; G08G 5/0021; G01C 23/00; G01S 13/91; G09B 29/007
See application file for complete search history.

(56) References Cited

U.S. PATENT DOCUMENTS

| | | | | |
|---|---|---|---|---|
| 5,948,040 A | * | 9/1999 | DeLorme ............... | G01C 21/36 340/990 |
| 2008/0004792 A1 | * | 1/2008 | Wise .................... | G08G 5/0043 701/120 |

(Continued)

FOREIGN PATENT DOCUMENTS

| | | |
|---|---|---|
| JP | 2003-132499 A | 5/2003 |
| JP | 2005-221486 A | 8/2005 |
| JP | 2005-326210 A | 11/2005 |

OTHER PUBLICATIONS

International Search Report for PCT Application No. PCT/JP2013/002134, mailed on May 14, 2013.
(Continued)

*Primary Examiner* — James A Thompson
*Assistant Examiner* — Tapas Mazumder

(57) ABSTRACT

A graph drawing device includes: a target-data acquiring unit that acquires plural items of target data each containing time data and two-dimensional data in two specific dimensions other than time; a differential calculating unit that calculates a differential time between the time data and a reference time concerning each of the target data acquired by the target-data acquiring unit; a differential-data generating unit that generates plural items of differential target data each obtained by replacing the time data contained in each of the target data with the differential time calculated by the differential calculating unit; and a drawing-data generating unit that converts each of the differential target data gener- (Continued)

ated by the differential-data generating unit into three-dimensional coordinate data in a three-dimensional coordinate system formed by a time axis and a coordinate plane formed by the two specific dimensions, and generates drawing data on a three-dimensional graph showing plural items of the three-dimensional coordinate data converted.

17 Claims, 16 Drawing Sheets

(51) Int. Cl.
    *G01S 13/91*     (2006.01)
    *G06T 11/20*     (2006.01)
    *G01C 23/00*     (2006.01)
    *G09B 29/00*     (2006.01)

(52) U.S. Cl.
    CPC ......... *G08G 5/0013* (2013.01); *G08G 5/0021* (2013.01); *G08G 5/0026* (2013.01); *G08G 5/0082* (2013.01); *G09B 29/007* (2013.01)

(56) References Cited

U.S. PATENT DOCUMENTS

2011/0167343 A1*   7/2011   Wright ................. G06T 11/206
                                                                     715/711
2012/0078495 A1*   3/2012   Hamblin ............. G08G 5/0021
                                                                       701/120

OTHER PUBLICATIONS

Write Opinion for PCT Application No. PCT/JP2013/002134, mailed on May 14, 2013.

\* cited by examiner

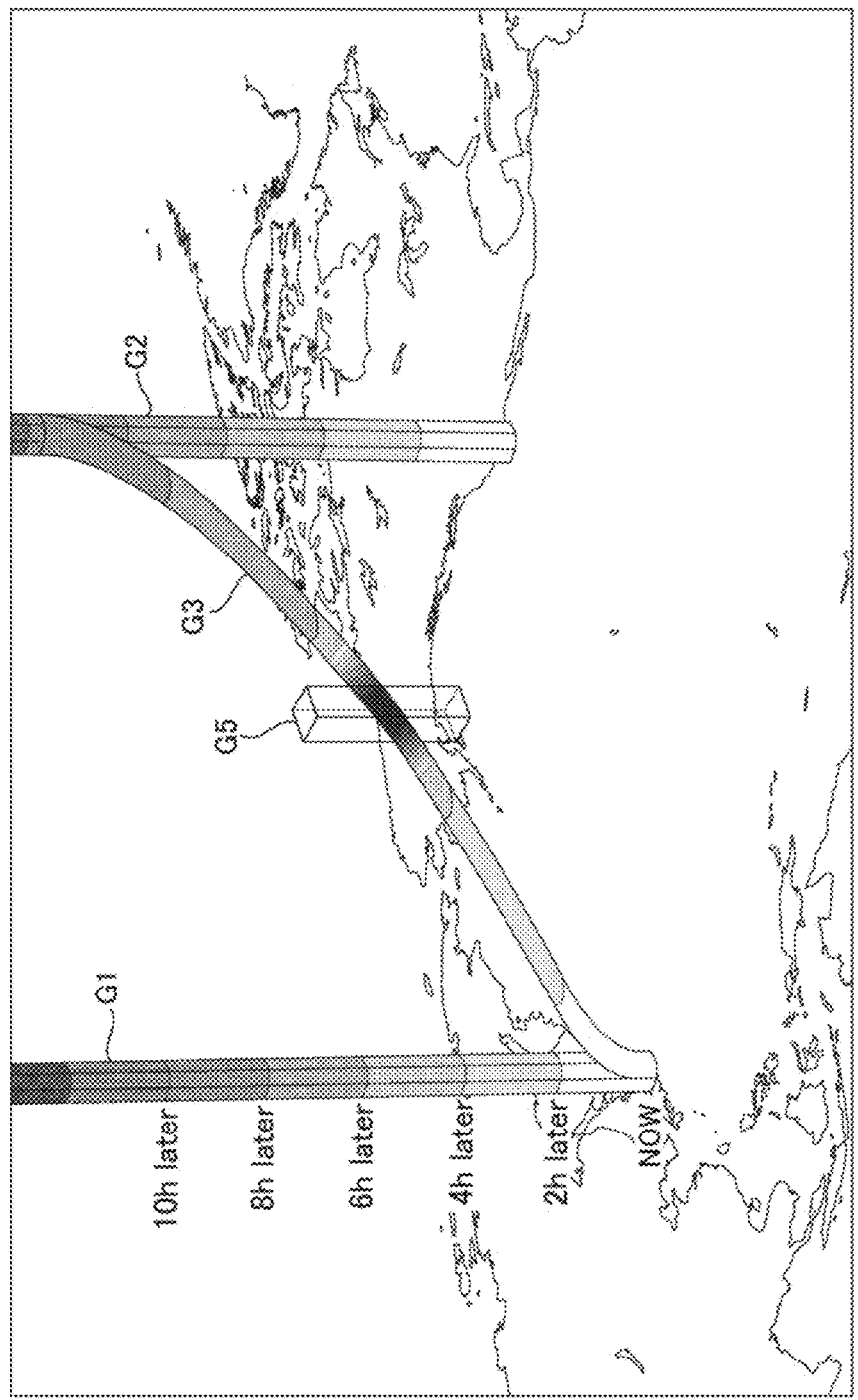

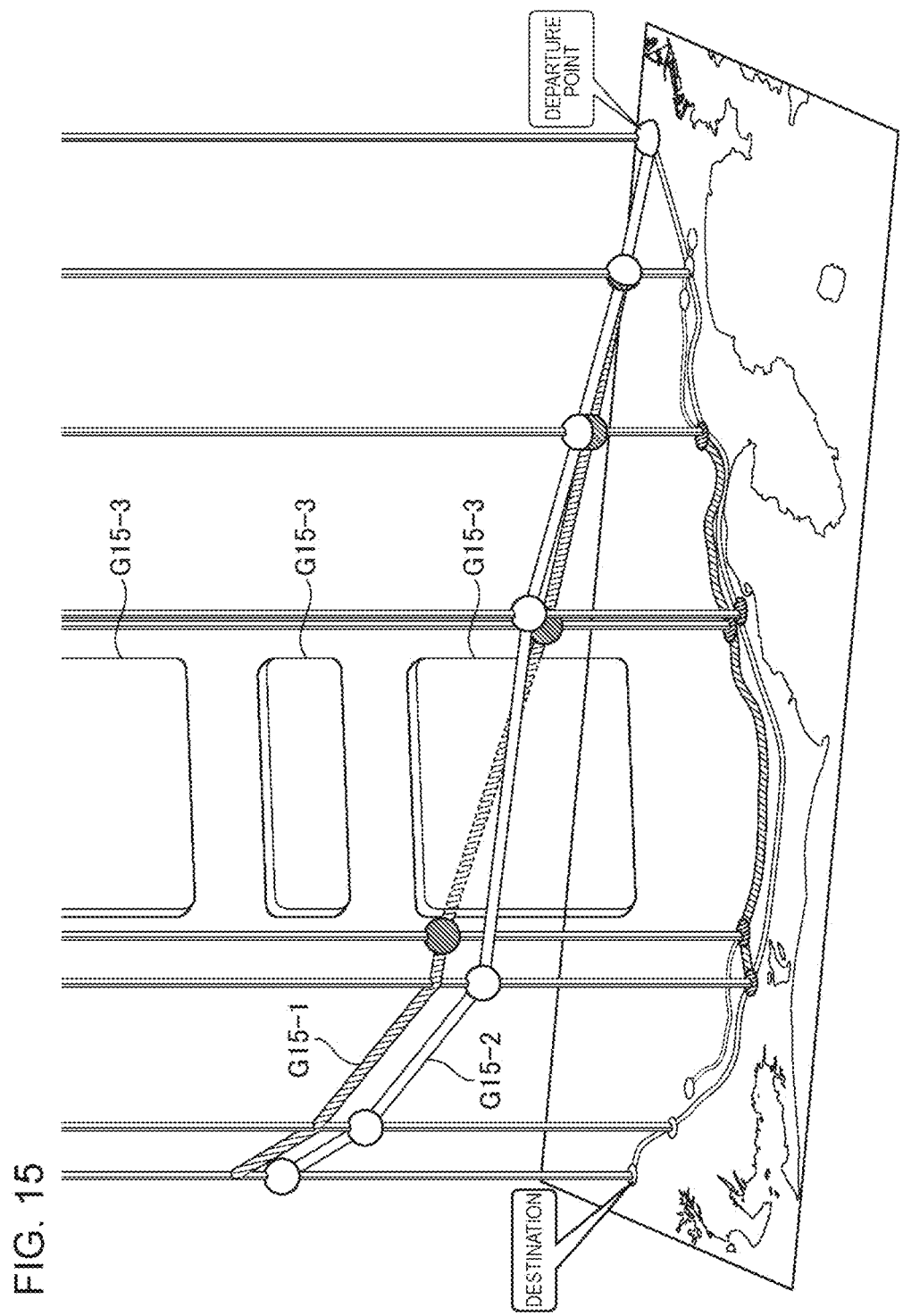

GRAPH DRAWING DEVICE AND GRAPH DRAWING METHOD

This application is a National Stage Entry of PCT/JP2013/002134 filed on Mar. 28, 2013, which claims priority from Japanese Patent Application 2012-179698 filed on Aug. 14, 2012, the contents of all of which are incorporated herein by reference, in their entirety.

TECHNICAL FIELD

The present invention relates to a technique of drawing a three-dimensional graph.

BACKGROUND ART

With development of information communication, sensing technology, or other technologies, various kinds of information (data) have been exponentially increasing. This huge amount of information exists in a manner such that these pieces of information are complicatedly associated with each other. This huge amount of information is also called big data. Currently, techniques of effectively utilizing the big data have received attention.

Operational fields that treat the big data are not limited to specific fields. In particular, in mission-critical (MC) operational fields, it is considered that operations can be more effective if the big data can be more effectively utilized. For example, air traffic control (hereinafter, referred to as ATC), which is one of the MC operational fields, collects and uses various kinds of information including, for example, the current location, altitude, traveling direction, ground speed, and weather information in association with plural aircrafts. For this operation, Patent Document 1 described below proposes a method of achieving visual recognition of flight situations of aircrafts in the ATC that treats the big data. More specifically, in this method, geographic features and flight locations (position and altitude) of the aircraft are displayed in a three-dimensional manner, and an alert mark is three-dimensionally displayed if the distance between two nearby aircrafts is less than a predetermined threshold value.

RELATED DOCUMENT

Patent Document

Patent Document 1: Japanese Patent Application Laid-open No. 2003-132499

SUMMARY OF THE INVENTION

Problem to be Solved by the Invention

However, with the method proposed in Patent Document 1 described above, it is difficult for an air traffic controller to recognize future flight situations concerning each of the aircrafts. In recent years, air carriers have been demanding to flexibly select a less risky route, a less swaying route, a more fuel efficient route, and the like, and hence, flight routes are selected in a more flexible manner, rather than in a fixed manner. This leads to an increase in operational loads that the ATC has to bear, in order to safely control the traffic of each aircraft that flexibly selects its own flight route. In other words, air traffic control services are required to provide not only recognition of the flight situations concerning each aircraft at a certain point in time. As described above, in current situations, there is no method of displaying big data, which changes over time, in an intuitively and easily recognizable manner.

The present invention has been made in view of the situations as described above, and provides a technique that displays data that change over time, in an intuitively and easily recognizable manner.

Means for Solving the Problem

Each aspect of the present invention employs the following configurations in order to solve the problem described above.

A graph drawing device according to a first aspect includes: a target-data acquiring unit that acquires plural items of target data each containing time data and two-dimensional data in two specific dimensions other than time; a differential calculating unit that calculates a differential time between the time data and a reference time concerning each of the target data acquired by the target-data acquiring unit; a differential-data generating unit that generates plural items of differential target data each obtained by replacing the time data contained in each of the target data with the differential time calculated by the differential calculating unit; and a drawing-data generating unit that converts each of the differential target data generated by the differential-data generating unit into three-dimensional coordinate data in a three-dimensional coordinate system formed by a time axis and a coordinate plane formed by the two specific dimensions, and generates drawing data on a three-dimensional graph showing plural items of the three-dimensional coordinate data converted.

A graph drawing method according to a second aspect includes: acquiring plural items of target data each containing time data and two-dimensional data in two specific dimensions other than time; calculating a differential time between the time data and a reference time concerning each of the target data; generating plural items of differential target data each obtained by replacing the time data contained in each of the target data with the differential time; converting each of the differential target data into three-dimensional coordinate data in a three-dimensional coordinate system formed by a time axis and a coordinate plane formed by the two specific dimensions; and generating drawing data on a three-dimensional graph showing plural items of the three-dimensional coordinate data converted.

Other aspects of the present disclosure may include a program that causes a computer to realize each of the configurations of the first aspect described above, or may include a computer-readable storage medium that records such a program. This storage medium includes a non-transitory tangible medium.

Effect of the Invention

According to each aspect described above, it is possible to provide a technique that displays data that change over time in an intuitively and easily recognizable manner.

BRIEF DESCRIPTION OF THE DRAWINGS

The object described above, other objects, features, and advantages will be made further clear by the preferred exemplary embodiments described below and the following drawings attached thereto.

FIG. 14A is a diagram illustrating an example of a three-dimensional graph displayed in accordance with the fourth exemplary embodiment.

FIG. 15 is a diagram illustrating an application example to a navigation system for an automobile.

DESCRIPTION OF EMBODIMENTS

Figure 1:
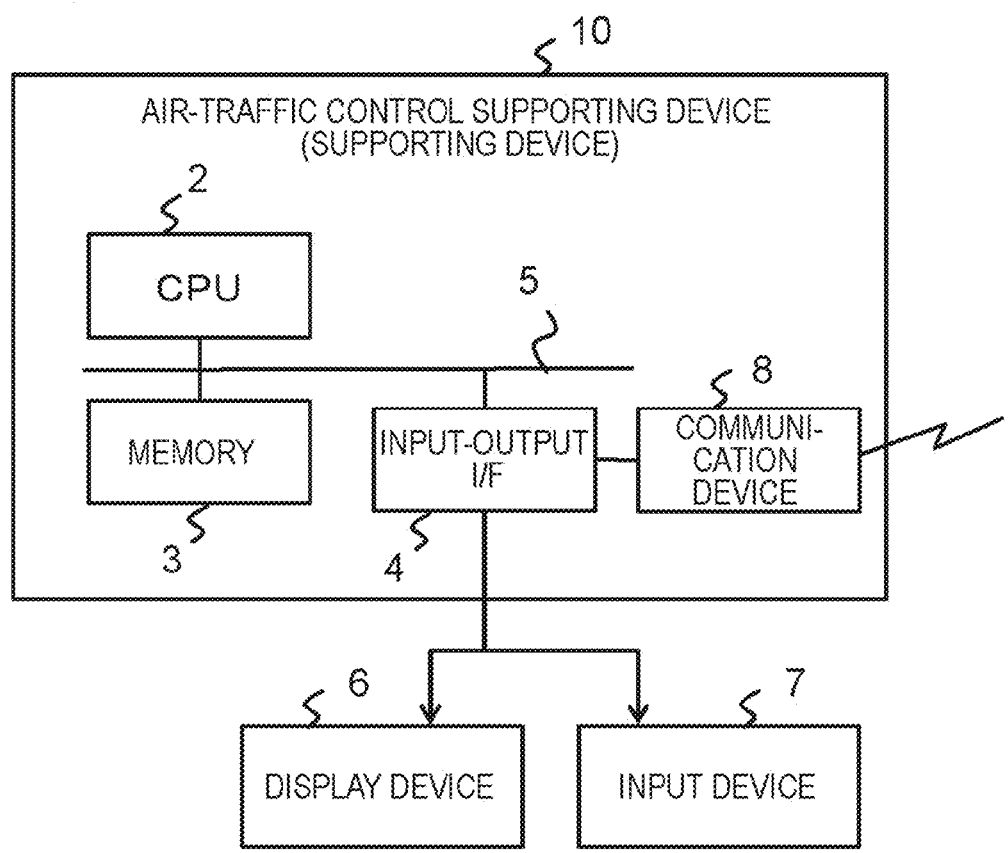
FIG. 1 is a diagram schematically illustrating an example of a hardware configuration of an air-traffic control supporting device according to a first exemplary embodiment.

Hereinbelow, exemplary embodiments according to the present invention will be described. Note that each exemplary embodiment described below is merely an example, and the present invention is not limited to the configuration of each of the exemplary embodiments described below.

A graph drawing device according to this exemplary embodiment includes: a target-data acquiring unit that acquires plural items of target data each containing time data and two-dimensional data in two specific dimensions other than time; a differential calculating unit that calculates a differential time between the time data and a reference time concerning each of the target data acquired by the target-data acquiring unit; a differential-data generating unit that generates plural items of differential target data each obtained by replacing the time data contained in each of the target data with the differential time calculated by the differential calculating unit; and a drawing-data generating unit that converts each of the differential target data generated by the differential-data generating unit into three-dimensional coordinate data in a three-dimensional coordinate system formed by a time axis and a coordinate plane formed by the two specific dimensions, and generates drawing data on a three-dimensional graph showing plural items of the three-dimensional coordinate data converted.

A graph drawing method according to this exemplary embodiment including: acquiring plural items of target data each containing time data and two-dimensional data in two specific dimensions other than time; calculating a differential time between the time data and a reference time concerning each of the target data; generating plural items of differential target data each obtained by replacing the time data contained in each of the target data with the differential time; converting each of the differential target data into three-dimensional coordinate data in a three-dimensional coordinate system formed by a time axis and a coordinate plane formed by the two specific dimensions; and generating drawing data on a three-dimensional graph showing plural items of the three-dimensional coordinate data converted.

In this exemplary embodiment, plural items of target data are acquired. Each of the plural items of the target data contains time data and two-dimensional data in two specific dimensions other than time. Here, the time data represents data indicating a certain point in time in predetermined time unit. In this exemplary embodiment, the time unit with which the time data is expressed is not limited, and hence, the unit for the time data indicated includes, for example, second, minute, hour, and day. The two-dimensional data in two specific dimensions represent data that is formed by two elements but does not include a time element. The two-dimensional data includes, for example, location data indicating a location on a certain plane area, and trading data including a stock price and the total transaction amount. In this exemplary embodiment, there is no limitation to two-dimensional data contained in the target data as long as the plural items of target data each indicate data that varies as time elapses.

In this exemplary embodiment described above, the plural items of target data are acquired, and plural items of differential target data are generated on the basis of these items of target data. The differential target data each contain the two-dimensional data in each of the target data, and a differential time between the time data in each of the target data and a reference time. This differential time indicates a length of time between a point in time indicated by the time data and a point in time indicated by the reference time. Here, the reference time means time data serving as a reference used for obtaining the differential time, and is indicated with a time unit, which is the same time unit as the time data contained in the target data. For the reference time, a time at which drawing is updated may be set, or a given time that a user desires to set may be set. Furthermore, According to the exemplary embodiment, drawing data on a three-dimensional graph showing the plural items of three-dimensional coordinate data, which are converted from plural items of differential target data, is generated. With this configuration, the three-dimensional graph drawn has a three-dimensional coordinate system including a time axis and two axes other than time.

Thus, according to this exemplary embodiment, in connection with the acquired target data, it is possible to show, by a three-dimensional graph, a correspondent relationship between a differential time obtained with a given point in time being a reference and certain information indicated in the two specific dimensions corresponding to the differential time. This three-dimensional graph visually shows, for example, certain information of several hours later since the present point in time (at a point in time when drawing is updated), or certain information of several hours before the present point in time. Furthermore, this target data is data in which certain information indicated in the two specific dimensions varies over time, in other words, is data which changes over time. Thus, with this three-dimensional graph, it is possible to display data that change over time, in a manner such that a user can intuitively and easily recognize them.

Below, the exemplary embodiment described above will be described in more detail. Each of the exemplary embodiments described below is an example in which the configuration of the graph drawing device described above and the graph drawing method are applied to an air-traffic control supporting device. Note that application of the configurations of the exemplary embodiment described above is not limited only to the air-traffic control supporting device, and it may be possible to apply it to various modes that treat data that change over time.

[First Exemplary Embodiment]
[Device Configuration]

FIG. 1 is a diagram schematically illustrating an example of a hardware configuration of an air-traffic control supporting device (hereinafter, referred to as a supporting device) 10 according to the first exemplary embodiment. The supporting device 10 according to the first exemplary embodiment is a so-called computer, and includes, for example, a central processing unit (CPU) 2, a memory 3, and an input-output interface (I/F) 4, each of which is connected to each other through a bus 5. The memory 3 includes, for example, a random access memory (RAM), a read only memory (ROM), a hard disk, and a portable storage medium.

The input-output I/F 4 is connected, for example, to a display device 6, an input device 7, and a communication device 8. The display device 6 includes, for example, a liquid crystal display (LCD) and a cathode ray tube (CRT) display, and is a device that displays a screen corresponding to drawing data obtained through processing performed, for example, by the CPU 2 or a graphics processing unit (GPU) (not illustrated). The input device 7 is a device such as a keyboard or a mouse that receives input through user operation. The communication device 8 communicates with another computer or device through a network (not illustrated). Note that the hardware configuration of the supporting device 10 is not limited.

Figure 2:
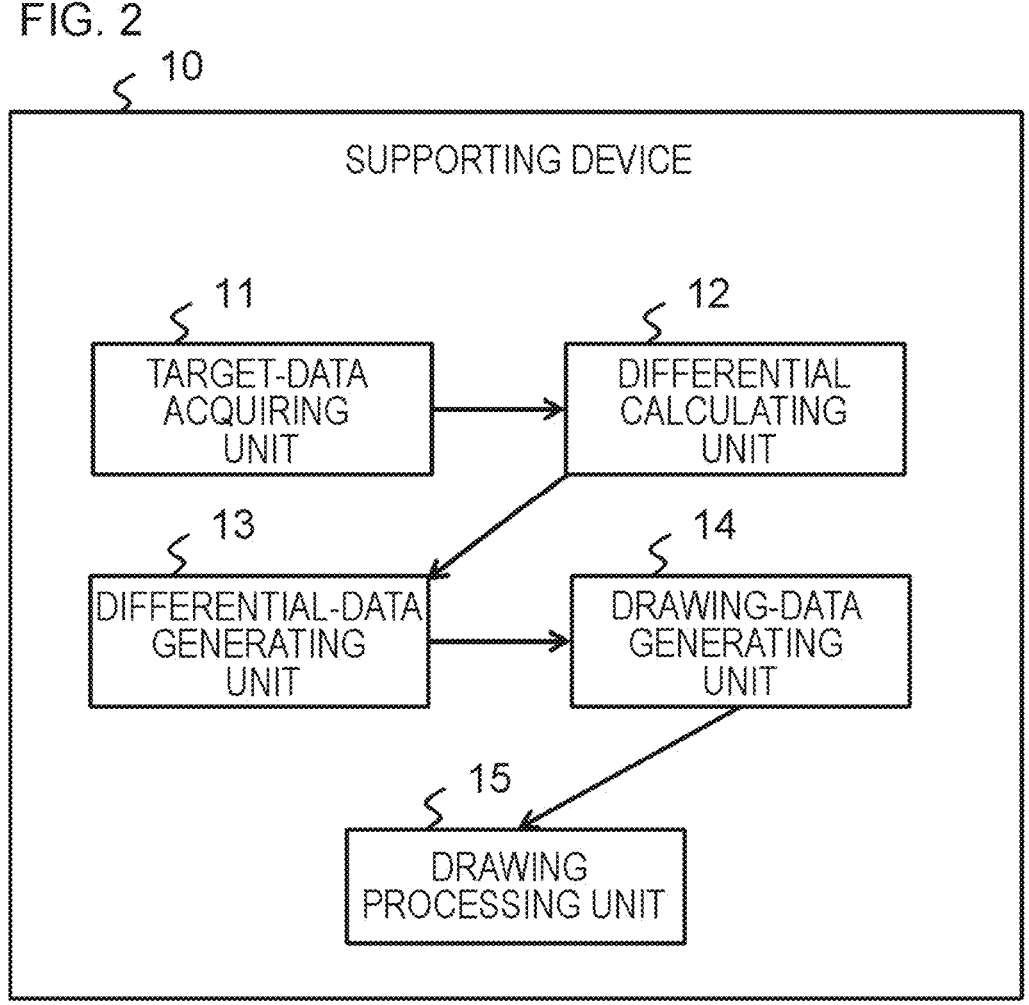
FIG. 2 is a diagram schematically illustrating an example of a process configuration of the air-traffic control supporting device according to the first exemplary embodiment.

FIG. 2 is a diagram schematically illustrating an example of a process configuration of the supporting device 10 according to the first exemplary embodiment. The supporting device 10 according to the first exemplary embodiment includes, for example, a target-data acquiring unit 11, a differential calculating unit 12, a differential-data generating unit 13, a drawing-data generating unit 14, and a drawing processing unit 15. Each of these processing modules is realized, for example, with the CPU 2 performing a program stored in the memory 3. Furthermore, this program may be installed, for example, from a portable storage medium such as a compact disc (CD) and a memory card or from another computer existing on a network through the input-output I/F 4, and may be stored in the memory 3.

In the first exemplary embodiment, the target-data acquiring unit 11 acquires plural items of flight schedule data on at least one aircraft flight (hereinafter, also simply referred to as an aircraft), which serve as plural items of target data serving as a basis for a three-dimensional graph drawn through processing performed by the supporting device 10. The term "flight schedule data" as used herein means a time (for example, a time of day) when one aircraft flight arrives at one geographical location on a flight route. Thus, the flight schedule data each contain one item of location data indicating a geographical location on the flight route concerning a certain aircraft flight, and one item of time data indicating a time when the aircraft flight arrives at this location. The flight schedule data may be inputted by a user operating the input device 7 on the basis of, for example, an input screen, or may be acquired from another computer such as air traffic schedule system, or may be acquired from a portable storage medium.

As described above, the first exemplary embodiment employs the location data indicating the geographical location as the two-dimensional data in two specific dimensions. In the first exemplary embodiment, the location data means a geographical location, in other words, information indicating a location on a horizontal plane excluding the altitude information. The location data is realized, for example, as two-dimensional data including longitude information and latitude information. As described above, the term "altitude" and the term "geographical location" are separately used as terms indicating a location.

The differential calculating unit 12, the differential-data generating unit 13, and the drawing-data generating unit 14 each perform processing to the target data as described above, as in the exemplary embodiment described above. However, in the first exemplary embodiment, at each drawing update time, which sequentially comes at given timings, the differential calculating unit 12 sets the reference time to be the point in time of the drawing update time, and then, sequentially calculates a differential time of each of the target data. This given timing may be a predetermined cycle, or may be a timing at which a user gives an instruction using the input device 7. The differential-data generating unit 13 uses each of the differential times sequentially calculated by the differential calculating unit 12 to sequentially generate plural items of differential target data. The drawing-data generating unit 14 generates drawing data that causes a three-dimensional graph to change, on the basis of the plural items of differential target data generated by the differential-data generating unit 13 and the reference time, which is set to be the point in time when drawing is updated. The drawing data that changes the three-dimensional graph may be realized by independently generating the drawing data every time drawing is updated, or may be realized by generating the drawing data only for a portion that has been changed.

The drawing processing unit 15 causes the display device 6 to display the three-dimensional graph on the basis of the drawing data generated by the drawing-data generating unit 14. The drawing processing unit 15 may be realized with a 3D graphic accelerator provided within the CPU 2 or outside of the CPU 2.

Figure 3:
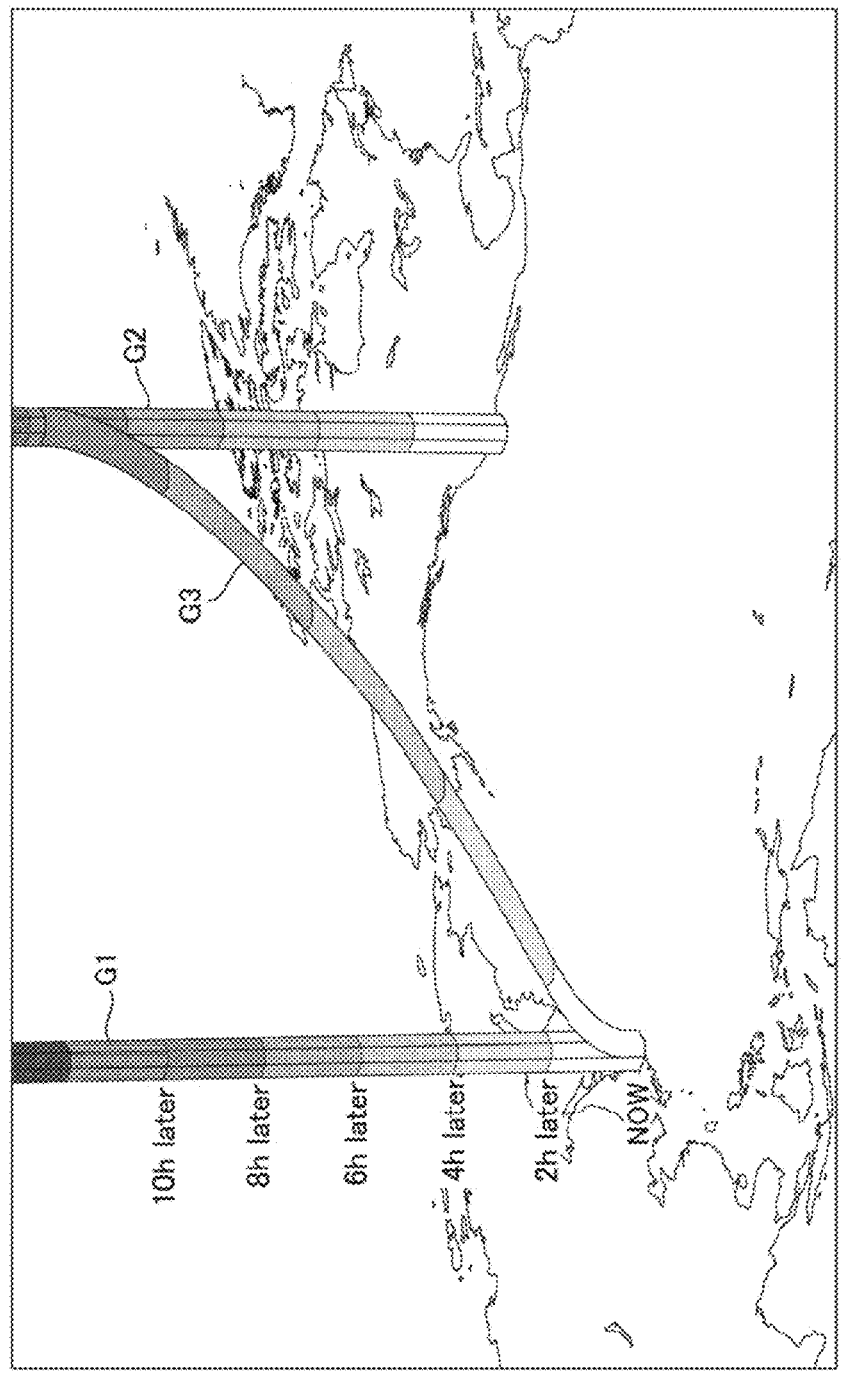
FIG. 3 is a diagram illustrating an example of a three-dimensional graph.

FIG. 3 is a diagram illustrating an example of the three-dimensional graph. In the example illustrated in FIG. 3, the flight route of one aircraft flight is displayed in three axes formed by latitude, longitude, and time. The time axis is placed in the vertical direction in the drawing, and a map image is shown on a coordinate plane at the reference time (differential time: zero, and at NOW in the drawing). Furthermore, pillar-shaped graphical elements G1 and G2 each expressing the time axis are displayed at the departure point and the arrival point. These graphical elements G1 and G2 are color-coded according to a predetermined period of time (for each two hour) on the time axis. Moreover, plural items of three-dimensional coordinate data forming the three-dimensional graph are expressed as a ribbon graphical element G3 that smoothly connects between data adjacent to each other, and the ribbon graphical element is color-coded according to the size in the time axis. Note that the three-dimensional graph displayed in this exemplary embodiment is not limited to the mode illustrated in FIG. 3. As described above, with this three-dimensional graph, it is possible to instantly recognize geographical locations of the aircraft flight in association with elapsed time since the reference time (for example, the present point in time (at a point in time when drawing is updated)).

In the case where the map image is shown on a coordinate plane corresponding to the horizontal plane as in the example illustrated in FIG. 3, it is only necessary that the supporting device 10 holds the map image in advance, and maps location data on this map image. Note that the mapping the location data on the map image is realized by using a known technique used, for example, in automotive navigation systems, and hence, explanation thereof will not be made here. Furthermore, in the example illustrated in FIG. 3, data on and after the reference time (NOW in the drawing) are displayed. However, it may be possible to display data before the reference time.

[Example of Operation]

Figure 4:
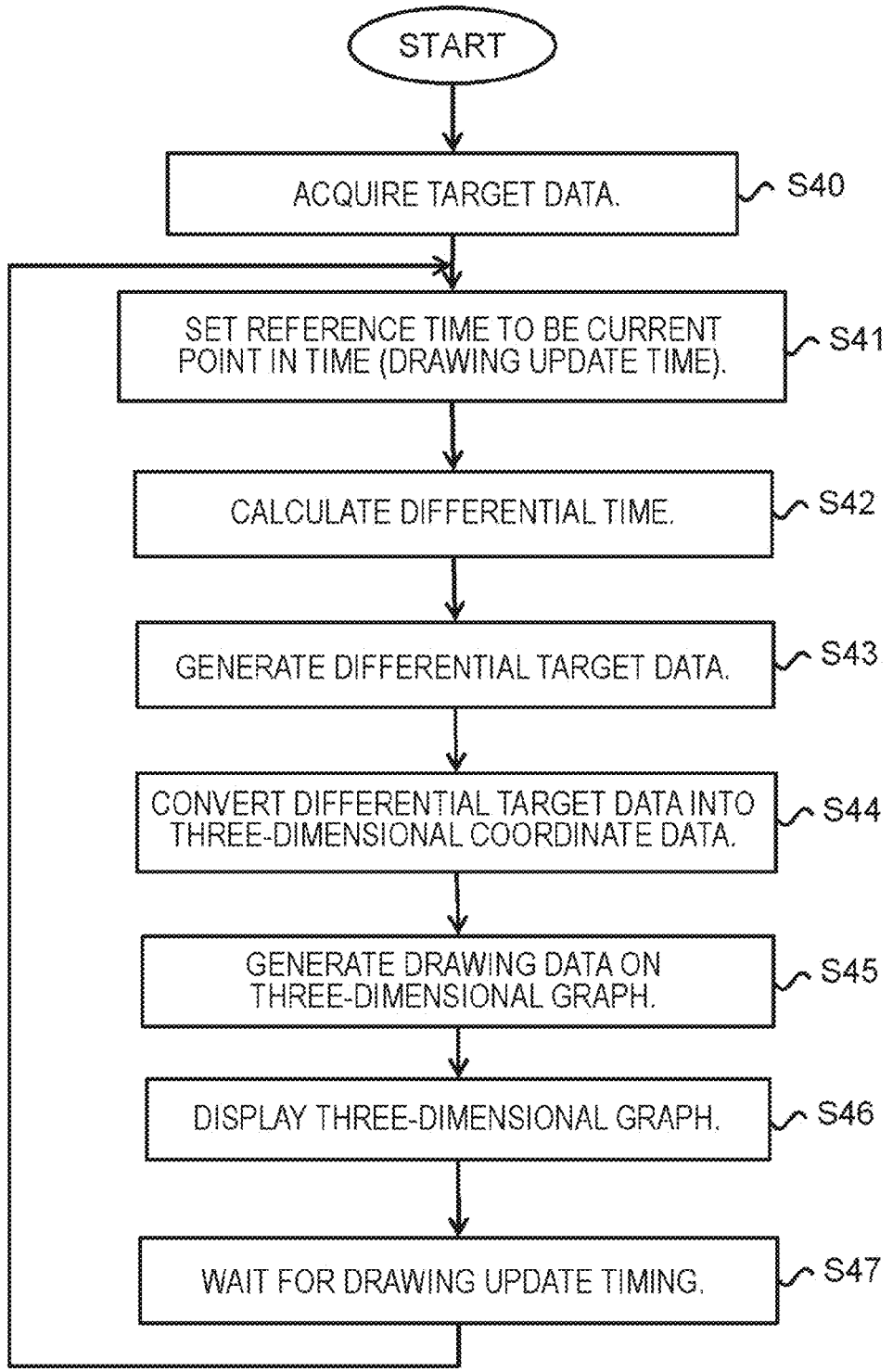
FIG. 4 is a flowchart showing an example of operations performed by the air-traffic control supporting device according to the first exemplary embodiment.

Below, the graph drawing method according to the first exemplary embodiment will be described with reference to FIG. 4. FIG. 4 is a flowchart showing an example of operations performed by the supporting device 10 according to the first exemplary embodiment.

The supporting device 10 first acquires plural items of flight schedule data concerning at least one aircraft flight and serving as target data used for graph drawing (S40).

The supporting device 10 sets the reference time to be the present point in time (at the time of updating drawing) (S41). Then, the supporting device 10 calculates a differential time between the time data and the reference time for each of the target data (S42). For example, in the case where the time data of certain target data indicates "15:20, June 27, 2012" and the reference time indicates "10:50, June 27, 2012," the supporting device 10 calculates the differential time for this target data to be four hours and thirty minutes.

The supporting device 10 generates plural differential target data, which are obtained by replacing the time data contained in each of the target data with the differential time (S43). For example, in the case where the location data indicates "Okinawa," and a differential time "four hours and thirty minutes" is calculated for target data having the time data indicating "15:20, June 27, 2012," the supporting device 10 generates differential target data having the location data indicating "Okinawa" and the differential time indicating "four hours and thirty minutes."

The supporting device 10 converts each of the differential target data into three-dimensional coordinate data in a three-dimensional coordinate system formed by a time axis and a coordinate plane corresponding to the horizontal plane (S44), and generates drawing data for a three-dimensional graph showing the converted plural items of three-dimensional coordinate data (S45).

The supporting device 10 causes the display device 6 to display a three-dimensional graph on the basis of the drawing data (S46). As a result, the three-dimensional graph illustrated in the example in FIG. 3 is shown. After this, the supporting device 10 performs step S41 and thereafter every time the drawing update timing comes (S47).

[Operation and Effect of First Exemplary Embodiment]

In the first exemplary embodiment, plural items of flight schedule data concerning at least one aircraft flight are acquired, and a correspondent relationship between a differential time with a given point in time being the reference and a geographical location corresponding to the differential time is displayed as a three-dimensional graph for each aircraft flight. This three-dimensional graph visually shows the geographical location of several hours later since a given reference time, and a geographical location of several hours before a given reference time. With this configuration, a user (air traffic controller) who views the displayed three-dimensional graph can visually recognize a location of each aircraft during flight after a given point in time since the reference time in an intuitive manner. As described above, according to the first exemplary embodiment, it is possible to display the flight route of each aircraft flight in the past and in the future using plural items of data concerning each of the aircraft flight in an intuitively and easily recognizable manner.

Furthermore, in the first exemplary embodiment, it may be possible to generate drawing data having a map image overlapped with a coordinate plane corresponding to a horizontal plane in the three-dimensional graph. With this configuration, it is possible to display geographical locations in an intuitively and easily recognizable manner.

In the example illustrated in FIG. 3, only the data concerning one aircraft flight is displayed. However, it may be possible to display data concerning plural aircraft flights. In this case, it is possible for a user (air traffic controller) to visually and easily recognize a difference on the time axis between aircrafts at a certain point on the coordinate plane corresponding to the horizontal plane. The difference on the time axis corresponds to a difference in arrival time at the point between aircraft flights, and hence, the proximity thereof indicates the degree of proximity between aircrafts. Thus, by viewing this three-dimensional graph, the air traffic controller can easily anticipate the degree of danger of each of the aircraft flights at a certain point in the future.

Furthermore, in the first exemplary embodiment, the differential calculating unit 12, the differential-data generating unit 13, the drawing-data generating unit 14, and the drawing processing unit 15 operate in accordance with drawing update times that sequentially come, whereby the three-dimensional graph changes.

Figure 5:
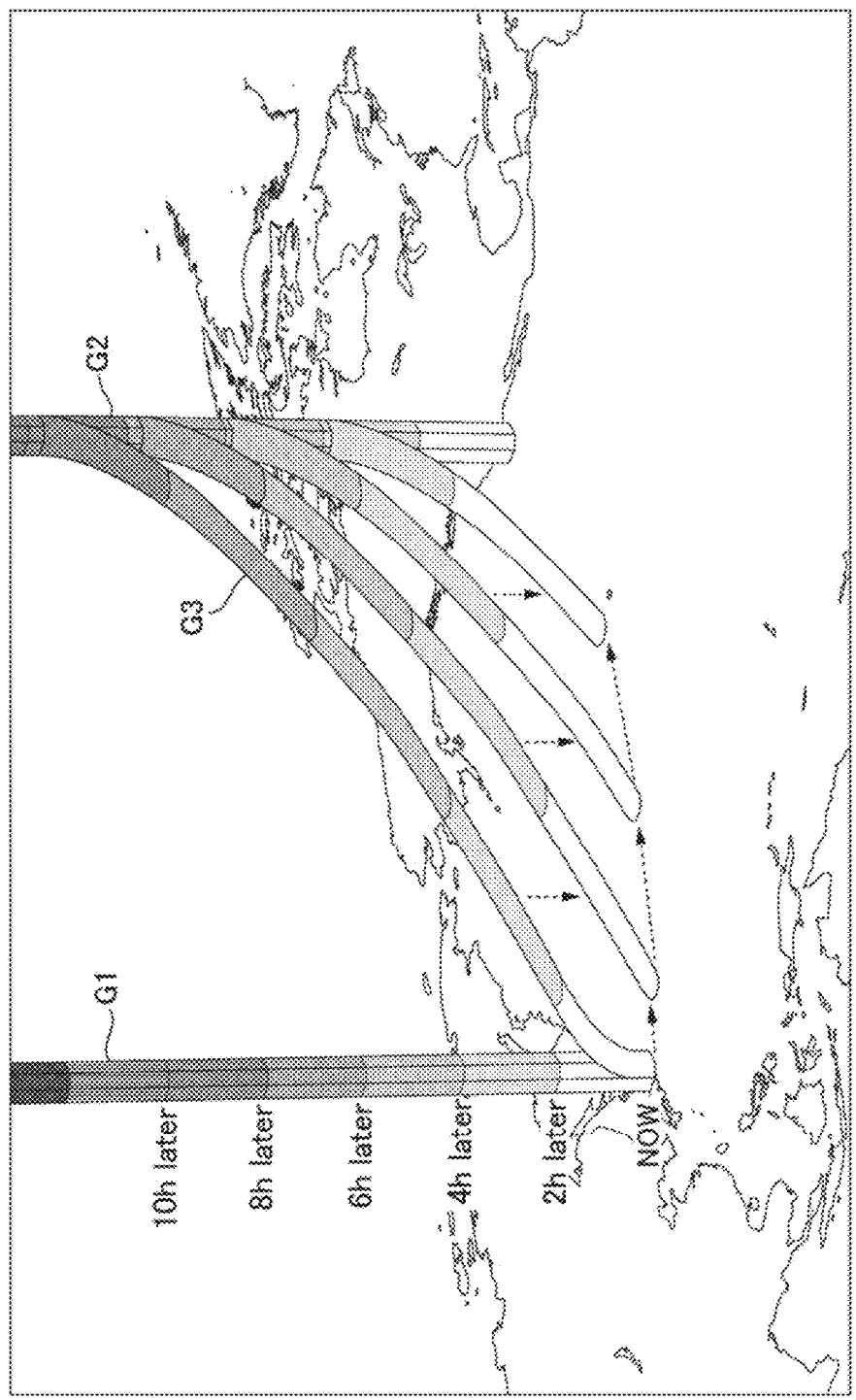
FIG. 5 is a diagram illustrating an example of changes of a three-dimensional graph in accordance with four reference times.

FIG. 5 is a diagram illustrating an example of changes of a three-dimensional graph with four reference times. FIG. 5 exemplarily illustrates a case where the reference time is set to each of the drawing update times that sequentially come. In the example illustrated in FIG. 5, the ribbon graphical element G3 moves toward a minus direction (direction going back to the past) of the time axis as time elapses. With this configuration, this graphical element G3 is displayed in a manner such that the location of the aircraft at each drawing update time moves from the departure point toward the destination. Furthermore, in the example illustrated in FIG. 5, data before (older than) the drawing update time is not displayed, and the map image is displayed on the coordinate plane indicating that the differential time is zero. Thus, it is possible to make the user easily recognize the location of the aircraft flight at the drawing update time.

It should be noted that, in the first exemplary embodiment described above, an axis indicating the altitude of the aircraft is not included in the three-dimensional coordinate system of the three-dimensional graph. This is because the altitude of the aircraft is determined in advance to some degree, and hence, for an air traffic controller, easily recognizing the altitude information is considered to be less important than easily recognizing the time axis.

[Second Exemplary Embodiment]

In the first exemplary embodiment described above, drawing data on a three-dimensional graph is generated using plural items of flight schedule data concerning at least one aircraft flight as target data. However, in the second exemplary embodiment, the target data is set to be flight schedule data in which actually measured data on an aircraft flight are reflected. For example, since performance of a global positioning system (GPS) for aircrafts has been improving in recent years, it is possible to correctly measure flight locations of each of the aircraft. Thus, if measured location data on aircrafts can be effectively used, this can be important in air traffic control services. Below, the supporting device 10 according to the second exemplary embodiment will be described with focus being placed on things different from those described in the first exemplary embodiment. In the following description, details similar to those in the first exemplary embodiment will not be repeated.

[Device Configuration]

Figure 6:
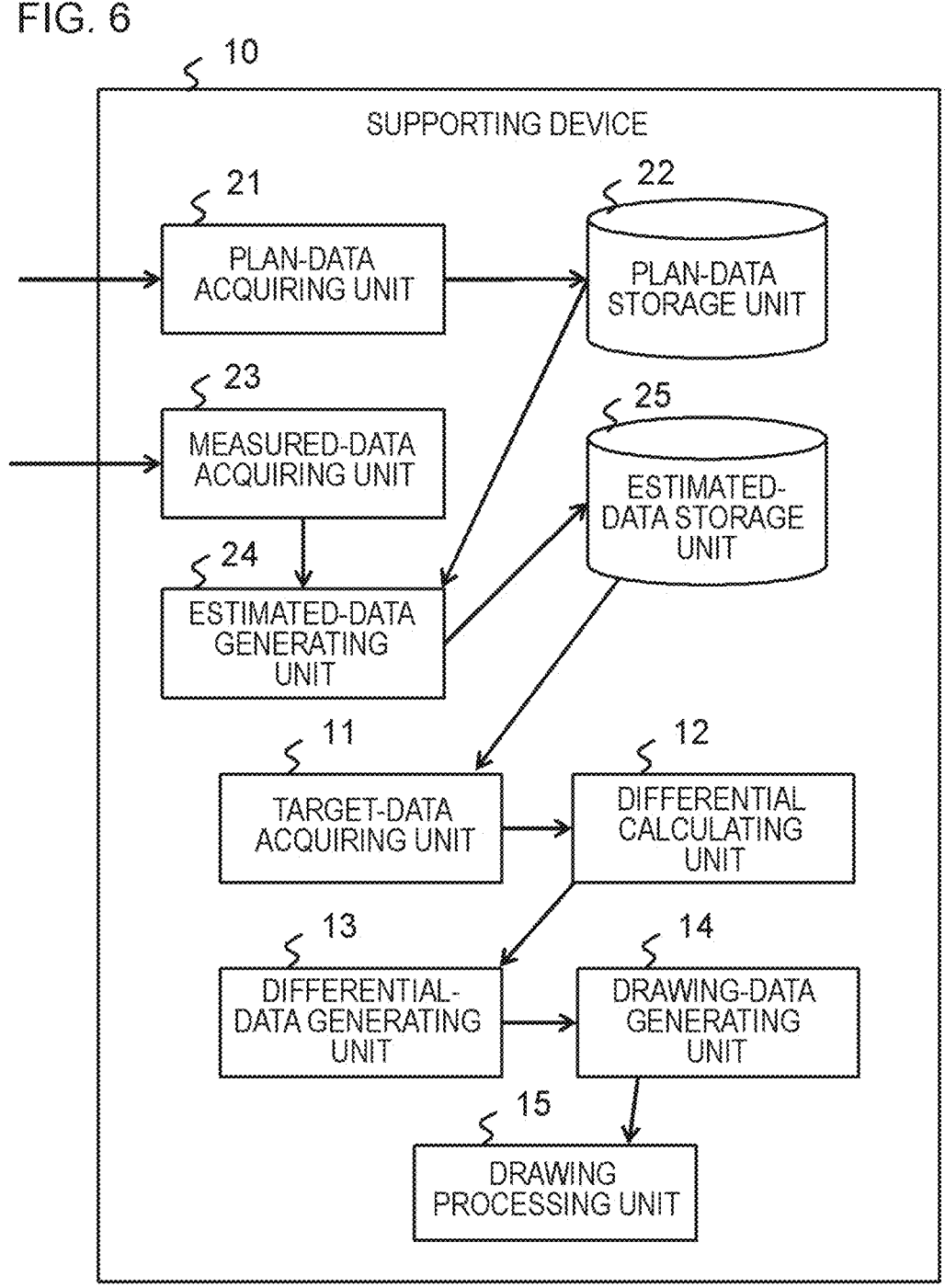
FIG. 6 is a diagram schematically illustrating an example of a process configuration of an air-traffic control supporting device according to a second exemplary embodiment.

FIG. 6 is a diagram schematically illustrating an example of a process configuration of the supporting device 10 according to the second exemplary embodiment. In addition to the configuration described of the first exemplary embodiment, the supporting device 10 according to the second exemplary embodiment further includes, for example, a plan-data acquiring unit 21, a plan-data storage unit 22, a measured-data acquiring unit 23, an estimated-data generating unit 24, and an estimated-data storage unit 25. Each of these processing modules is realized, for example, with the CPU 2 running a program stored in the memory 3.

The plan-data acquiring unit 21 acquires the data acquired by the target-data acquiring unit 11 in the first exemplary embodiment described above, in other words, plural items of flight schedule data concerning at least one aircraft flight. The plan-data acquiring unit 21 stores the acquired plural items of flight schedule data in the plan-data storage unit 22. The data acquired by the plan-data acquiring unit 21 serves as a basis for a three-dimensional graph drawn through processing performed by the supporting device 10, and hence, may be called source data. Thus, the plan-data acquiring unit 21 may be called a source-data acquiring unit.

The plan-data storage unit 22 stores plural items of flight schedule data (plural items of source data) concerning each aircraft flight and acquired by the plan-data acquiring unit 21.

The measured-data acquiring unit 23 acquires geographical location data measured, for example, with a radar device (not illustrated) and concerning each aircraft serving as a target of control, and measurement time data corresponding to a time when this geographical location data has been measured. Hereinafter, the geographical location data acquired by the measured-data acquiring unit 23 is referred to as measured location data. The measured location data may be acquired voluntarily by the measured-data acquiring unit 23 at a given timing, or may be delivered from a measuring device.

The estimated-data generating unit 24 generates plural items of estimated data each containing time data and location data indicating a geographical location concerning at least one aircraft flight, using the measured location data and the measurement time data each acquired by the measured-data acquiring unit 23 as well as plural items of flight schedule data acquired by the plan-data acquiring unit 21.

The plural items of estimated data generated are data obtained by correcting the plural items of flight schedule data acquired by the plan-data acquiring unit 21 and concerning each aircraft flight on the basis of the measured location data and the measurement time data acquired by the measured-data acquiring unit 23 in connection with the aircraft flight. For example, the data acquired by the measured-data acquiring unit 23 and the data acquired by the plan-data acquiring unit 21 are associated with each other by an ID for identifying each aircraft flight. In this case, the measured-data acquiring unit 23 and the plan-data acquiring unit 21 acquire this ID together with each data.

For example, the estimated-data generating unit 24 extracts, from the plan-data storage unit 22, plural items of source data concerning an aircraft associated with the measured location data and the measurement time data acquired by the measured-data acquiring unit 23; calculates at least one flight speed on the basis of the extracted plural items of source data; and generates the plural items of estimated data so that the calculated at least one flight speed is maintained with reference to the measured location data and the measurement time data. With this method, even if the measured location data and the measurement time data indicate that the aircraft is delayed, new flight schedule data is calculated again on the assumption that the flight speed corresponding to the flight schedule data acquired by the plan-data acquiring unit 21 is maintained, and is generated as the estimated data.

Furthermore, the estimated-data generating unit 24 may retain histories of the measured location data and the measurement time data concerning each of the aircraft flights, calculate the flight speed on the basis of the histories, and generate plural items of estimated data so that the calculated flight speed is maintained with reference to the measured location data and the measurement time data. With this method, in the case where the measured location data and the measurement time data indicate that the aircraft is delayed, a flight speed corresponding to the delay is calculated. Thus, new flight schedule data is calculated again on the basis of a speed close to the actual speed, and is generated as the estimated data.

The estimated-data storage unit 25 stores plural items of estimated data generated by the estimated-data generating unit 24 and concerning at least one aircraft flight. The estimated-data storage unit 25 stores the source data concerning this aircraft as an initial value of the estimated data.

The target-data acquiring unit 11 acquires the plural items of estimated data stored in the estimated-data storage unit 25 as the target data for graph drawing.

[Example of Operation]

Below, the graph drawing method according to the second exemplary embodiment will be described. In the second exemplary embodiment, plural items of estimated data stored in the estimated-data storage unit 25 are acquired as the target data for graph drawing. The graph drawing method according to the second exemplary embodiment is similar to that in the first exemplary embodiment except that the target data is acquired every time a drawing update timing comes (see FIG. 4).

Figure 7:
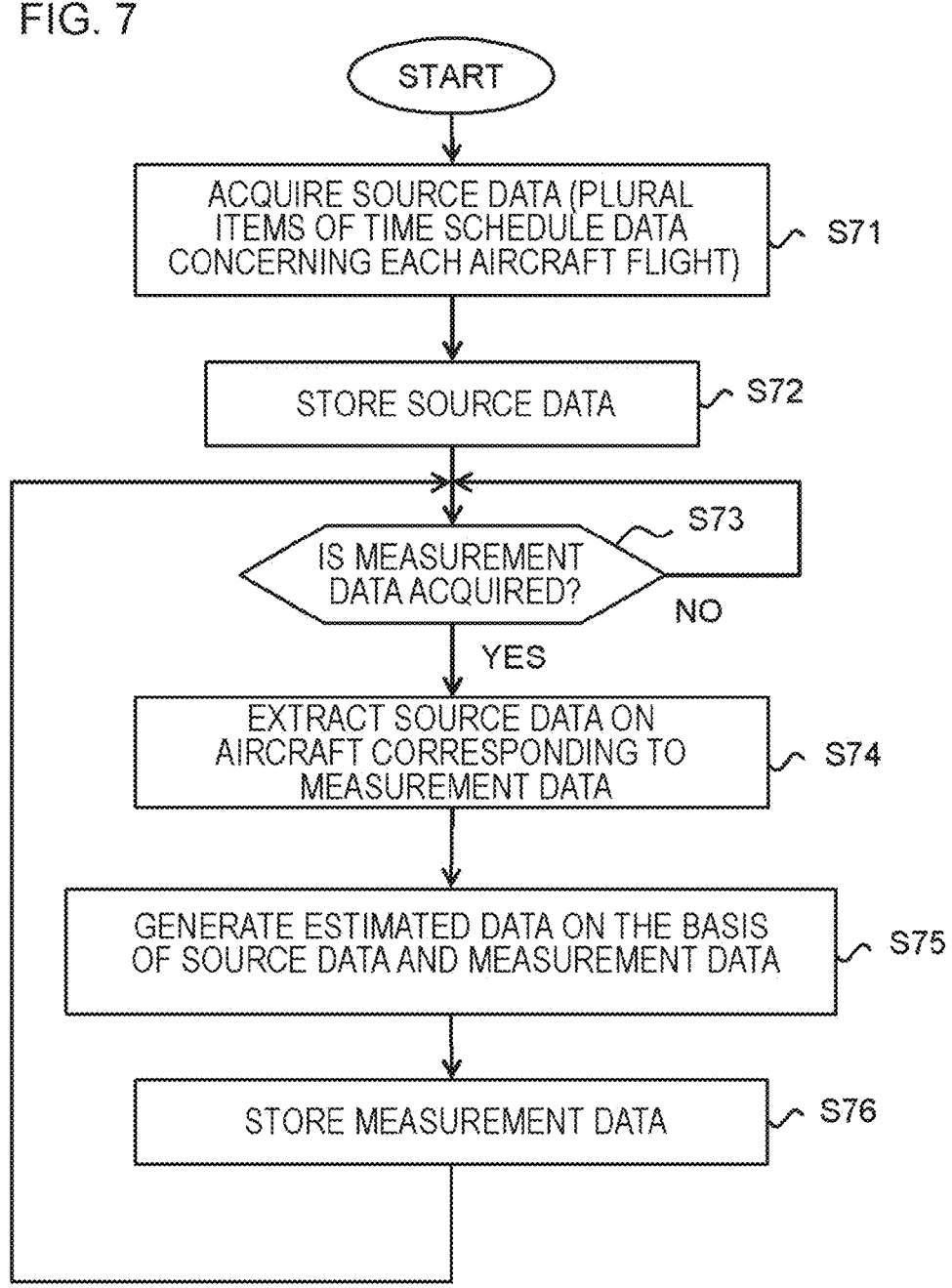
FIG. 7 is a flowchart showing an example of operations performed by the air-traffic control supporting device according to the second exemplary embodiment in connection with generation of target data (estimated data) serving as a basis for a three-dimensional graph.

FIG. 7 is a flowchart showing an example of operations performed by the supporting device 10 according to the second exemplary embodiment in connection with generation of the target data (estimated data) serving as a basis for a three-dimensional graph. The supporting device 10 acquires plural items of flight schedule data concerning at least one aircraft flight (S71), and store them in the plan-data storage unit 22 (S72).

Then, the supporting device 10 voluntarily or involuntarily acquires the measurement data (the measured location data and the measurement time data) concerning a certain aircraft at a given timing (S73). Once the supporting device 10 acquires the measurement data (S73; YES), the supporting device 10 extracts source data on the aircraft corresponding to the measurement data from the plan-data storage unit 22 (S74).

On the basis of the extracted source data and the acquired measurement data, the supporting device 10 generates estimated data on the aircraft associated with the measurement data (S75). This estimated data is generated by correcting the source data on the basis of the flight speed obtained on the basis of the source data or flight speed obtained on the basis of the history of the measurement data as described above.

The supporting device 10 stores the generated estimated data in the estimated-data storage unit 25 (S76). After this, the supporting device 10 performs each of the steps described above every time new measurement data is acquired (S73; YES).

Figure 8:
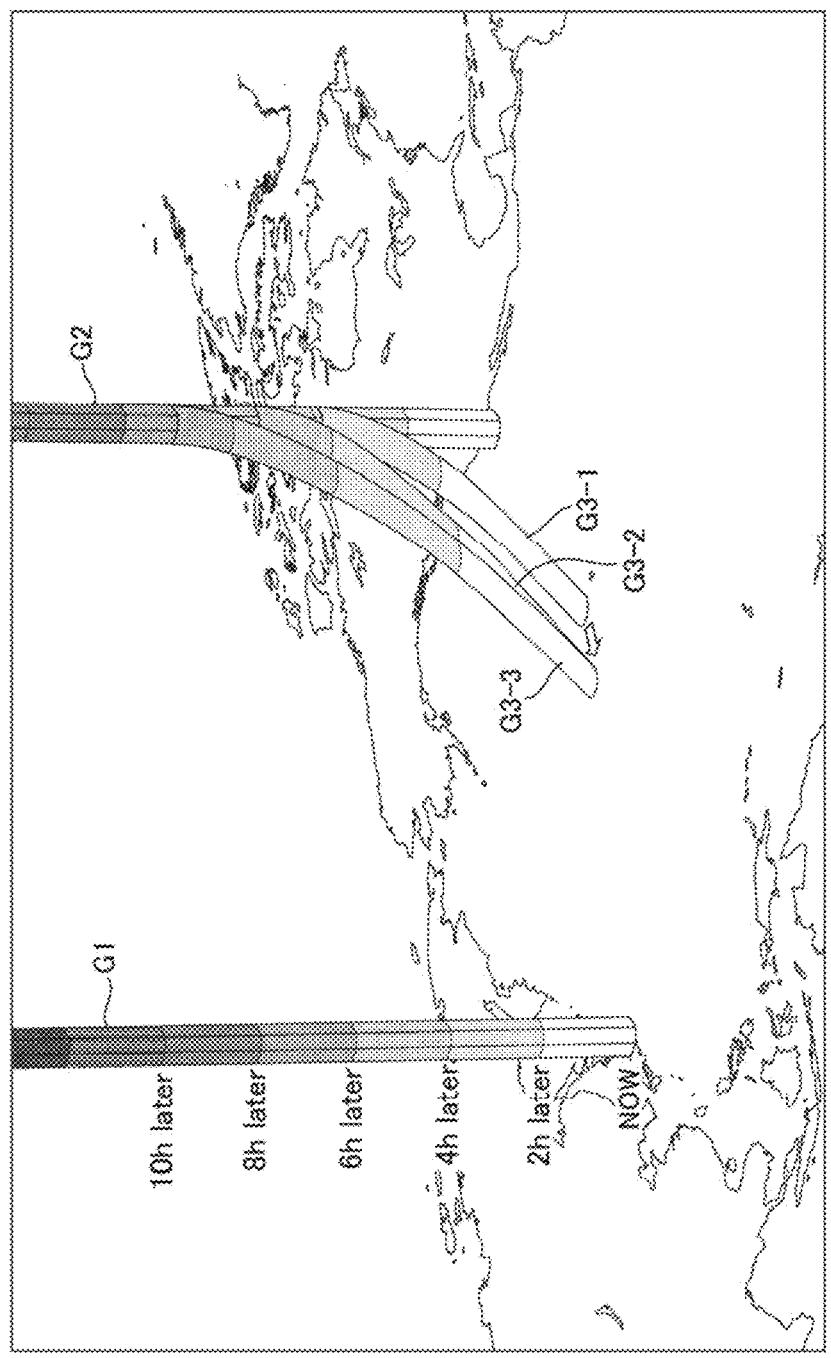
FIG. 8 is a diagram illustrating three forms of three-dimensional graphs that can be displayed with the same reference time.

FIG. 8 is a diagram illustrating three forms of three-dimensional graphs that can be displayed with the same reference time. For example, the supporting device 10 displays a three-dimensional graph having one form of the three forms in the example illustrated in FIG. 8 at a certain reference time.

The graphical element G3-1 corresponds to estimated data that has not been updated and is unchanged from the source data, the graphical element G3-2 corresponds to estimated data generated in accordance with the flight speed obtained on the basis of the source data, and the graphical element G3-3 corresponds to estimated data generated in accordance with the flight speed obtained on the basis of a history of the measurement data. According to the graph, the graphical elements G3-2 and G3-3 are located closer to the departure point than the graphical element G3-1 is located, and hence, the example illustrated in FIG. 8 shows a state in which the target aircraft flight is behind flight schedule, which is planned on the basis of the source data. Furthermore, the graphical element G3-3 corresponds to estimated data generated on the basis of the flight speed corresponding with the delay, and hence, the differential time of the graphical element G3-3 at the arrival point is greater than that of the graphical element G3-2.

[Operation and Effect of Second Exemplary Embodiment]

In the second exemplary embodiment, the actual location of an aircraft is measured at a given timing, and estimated data is generated on the basis of the flight schedule data (source data), the measured location data, and the measurement time data concerning the aircraft. Then, on the basis of this estimated data, the correspondent relationship between the differential time based on a given point in time and the geographical location corresponding thereto is displayed as a three-dimensional graph for each aircraft flight.

With these operations, according to the second exemplary embodiment, it is possible to display the flight schedule of each aircraft flight in the future in which actual locations of the aircraft are reflected, in an intuitively and easily recognizable manner. As a result, an air traffic controller can easily and immediately recognize dangerous situations such as a near miss between aircrafts occurring in the future at a certain point in accordance with delay from the original schedule, and furthermore, can appropriately perform ATC.

[Third Exemplary Embodiment]

Weather conditions largely affect flight routes. Furthermore, weather observation technologies and weather forecast technologies have been improving. In view of these circumstances, the third exemplary embodiment employs target data further having observed weather information and information on weather forecasts reflected therein. Below, the supporting device 10 according to the third exemplary embodiment will be described with focus being placed on things different from those in the first exemplary embodiment and the second exemplary embodiment. In the following description, explanations of details similar to those in the first exemplary embodiment and the second exemplary embodiment will not be repeated.

Figure 9:
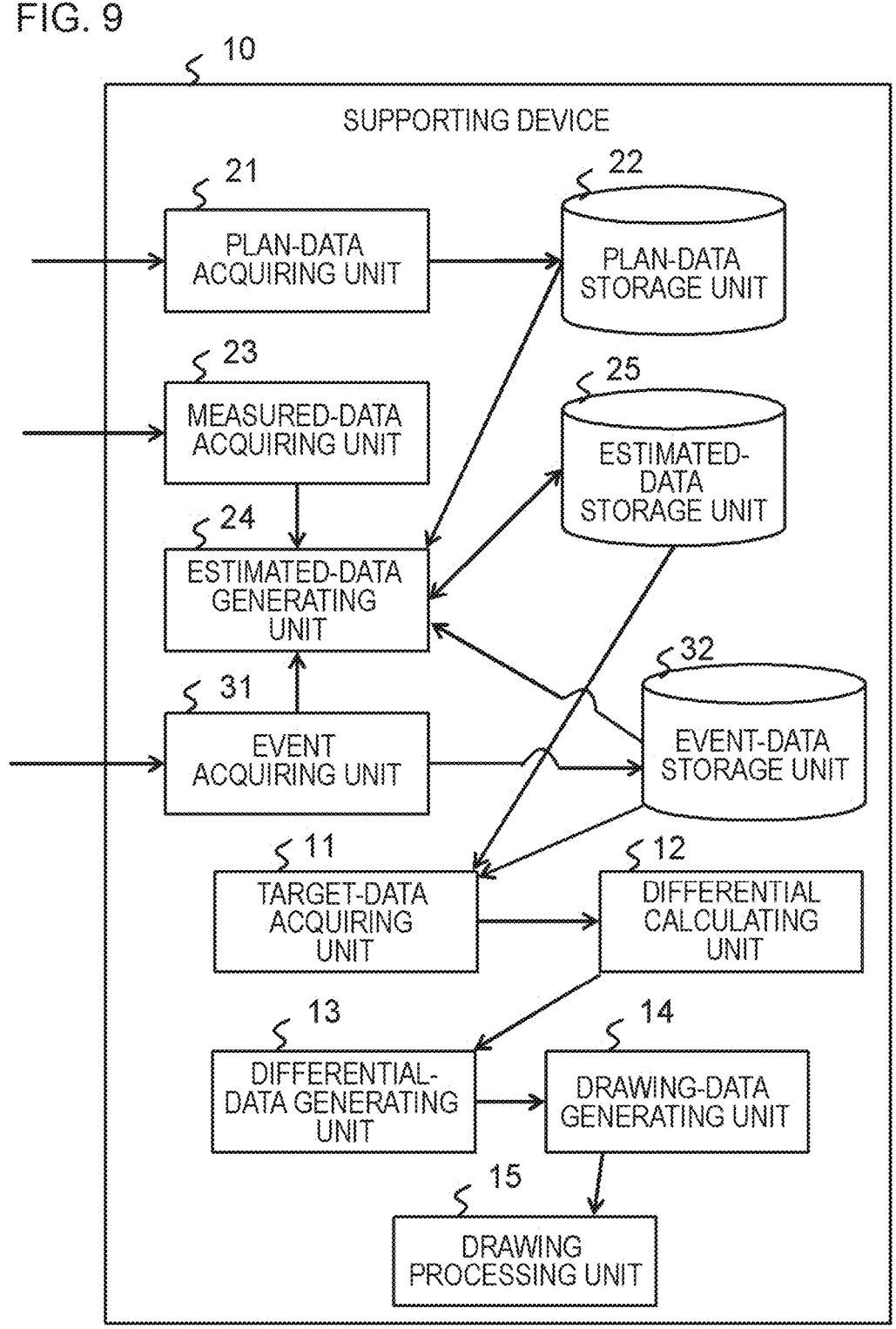
FIG. 9 is a diagram schematically illustrating an example of a process configuration of an air-traffic control supporting device according to a third exemplary embodiment.

FIG. 9 is a diagram schematically illustrating an example of a process configuration of the supporting device 10 according to the third exemplary embodiment. In addition to the configuration of the second exemplary embodiment, the supporting device 10 according to the third exemplary embodiment further includes an event acquiring unit 31. The event acquiring unit 31 is realized, for example, with the CPU 2 running a program stored in the memory 3.

The event acquiring unit 31 acquires plural items of event data each indicating a specific event occurring at a given geographical location from a given occurrence time for a given period of time, and each containing time data indicating a point in time during the period of time and location data indicating a location at which the specific event occurs. In the third exemplary embodiment, event data concerning a weather element such as typhoon and turbulence that may affect the flight route of an aircraft is acquired. The event data acquired by the event acquiring unit 31 contains actually observed weather information and predicted weather forecast information concerning a certain weather element. Furthermore, this weather element occurs in a wide area to some degree, and hence, the location data contained in the event data is data with which this area can be identified. The event acquiring unit 31 stores the acquired event data in the event-data storage unit 32.

At the time of generating the estimated data, the estimated-data generating unit 24 further takes into consideration the event data stored in the event-data storage unit 32 as well as the measurement data acquired by the measured-data acquiring unit 23. More specifically, in the case where the geographical area at a certain time indicated by the event data overlaps with the geographical location at a certain time indicated by the estimated data generated on the basis of this measurement data and source data, the estimated-data generating unit 24 corrects estimated data of which time and geographical location overlap with those of the event data, and corrects estimated data indicating a time on and after the time indicated by the estimated data. Hereinafter, overlapping of time and geographical location indicated by estimated data with time and geographical area indicated by event data is also referred to as overlap between the estimated data and the event data.

The estimated-data generating unit 24 corrects the time data of estimated data in a manner such that the flight speed of the aircraft changes during a time when the aircraft flies in the geographical area indicated by the event data. The aircraft may fly at low speed in turbulence or other weather conditions, and may fly at high flight speed depending on directions of jet stream. The estimated-data generating unit 24 changes the flight speed of an aircraft according to weather conditions indicated by the event data. The estimated-data generating unit 24 may correct the location data of the estimated data so as to avoid the geographical area indicated by the event data. The estimated-data generating unit 24 stores the estimated data further having the event data reflected therein, in the estimated-data storage unit 25.

The target-data acquiring unit 11 further acquires the event data from the event-data storage unit 32 in addition to the target data.

The differential calculating unit 12 further calculates a differential time between time data and a reference time in connection with each of the event data acquired by the event acquiring unit 31.

The differential-data generating unit 13 further generates plural items of differential event data obtained by replacing the time data contained in each of the event data with the differential time calculated by the differential calculating unit 12.

The drawing-data generating unit 14 converts each of the differential event data into three-dimensional coordinate data in the three-dimensional coordinate system, and generates drawing data on a three-dimensional graph further showing plural items of the three-dimensional coordinate data that are converted from the plural items of differential event data.

[Example of Operation]

Figure 10:
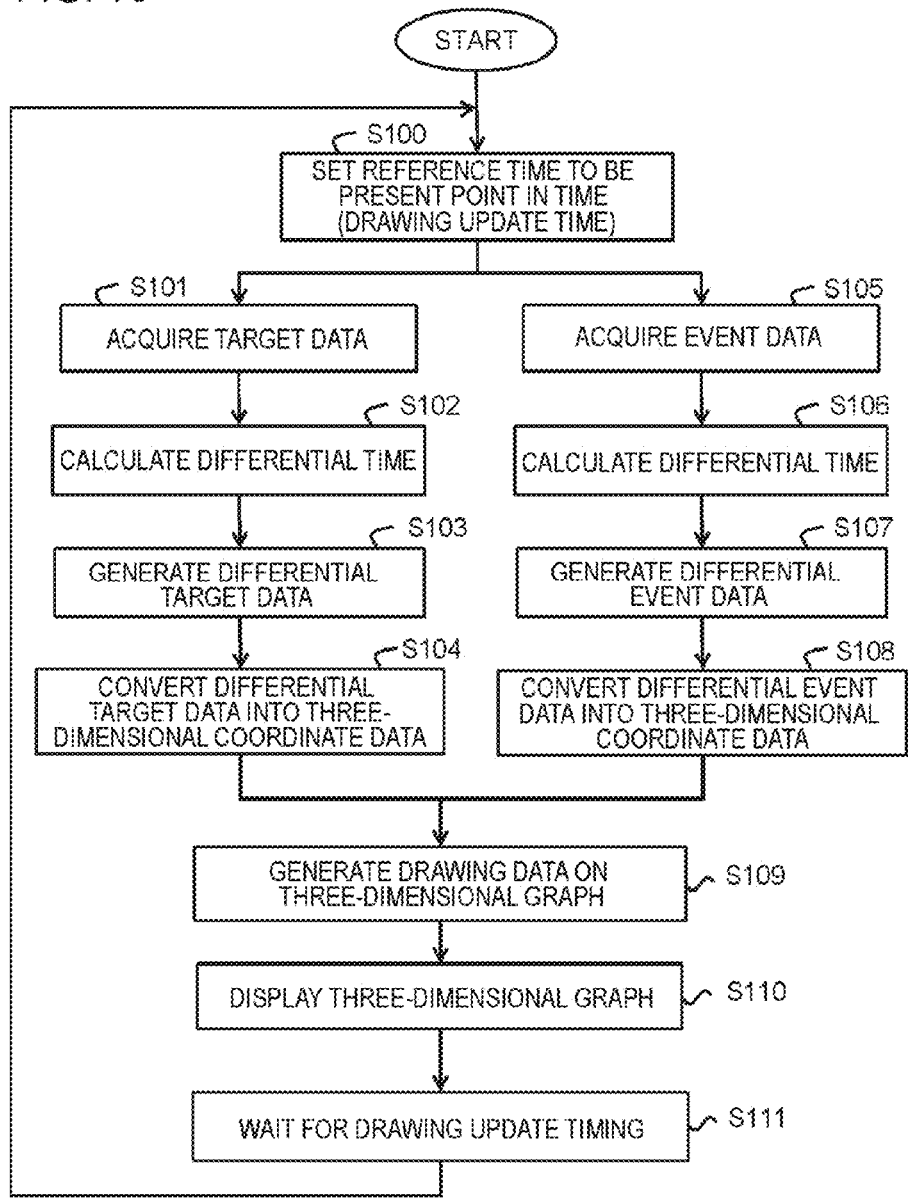
FIG. 10 is a flowchart showing an example of operations performed by the air-traffic control supporting device according to the third exemplary embodiment.

Below, a graph drawing method according to the third exemplary embodiment will be described with reference to FIG. 10 and FIG. 11. FIG. 10 is a flowchart showing an example of operations performed by the supporting device 10 according to the third exemplary embodiment. The supporting device 10 first sets the reference time to be a present point in time (at the time of updating drawing) (S100). Step S101 to step S104 are similar to step S40 and from step S42 to step S44 in FIG. 4, and hence, explanation thereof will not be repeated.

The supporting device 10 acquires plural items of event data from the event-data storage unit 32 (S105).

The supporting device 10 calculates a differential time between time data and the reference data in connection with each of the event data acquired (S106).

The supporting device 10 generates plural items of differential event data in which time data contained in each of the event data is replaced with each differential time calculated in step S106 (S107).

The supporting device 10 converts each of the differential event data into three-dimensional coordinate data in the three-dimensional coordinate system (S108).

It should be noted that FIG. 10 illustrates an example in which processing steps (S101 to S104) performed to target data and processing steps (S105 to S108) performed to event data are performed in parallel. However, these processing steps may be performed in a sequential manner.

The supporting device 10 generates drawing data on a three-dimensional graph showing plural items of three-dimensional coordinate data that are converted from plural items of differential target data and plural items of three-dimensional coordinate data that are converted from plural items of differential event data (S109).

The supporting device 10 causes the display device 6 to display a three-dimensional graph based on the drawing data (S110). As a result, the three-dimensional graph shown in the example in FIG. 11 is displayed. After this, the supporting device 10 performs each of the steps described above every time drawing update timing comes (S111).

Figure 11:
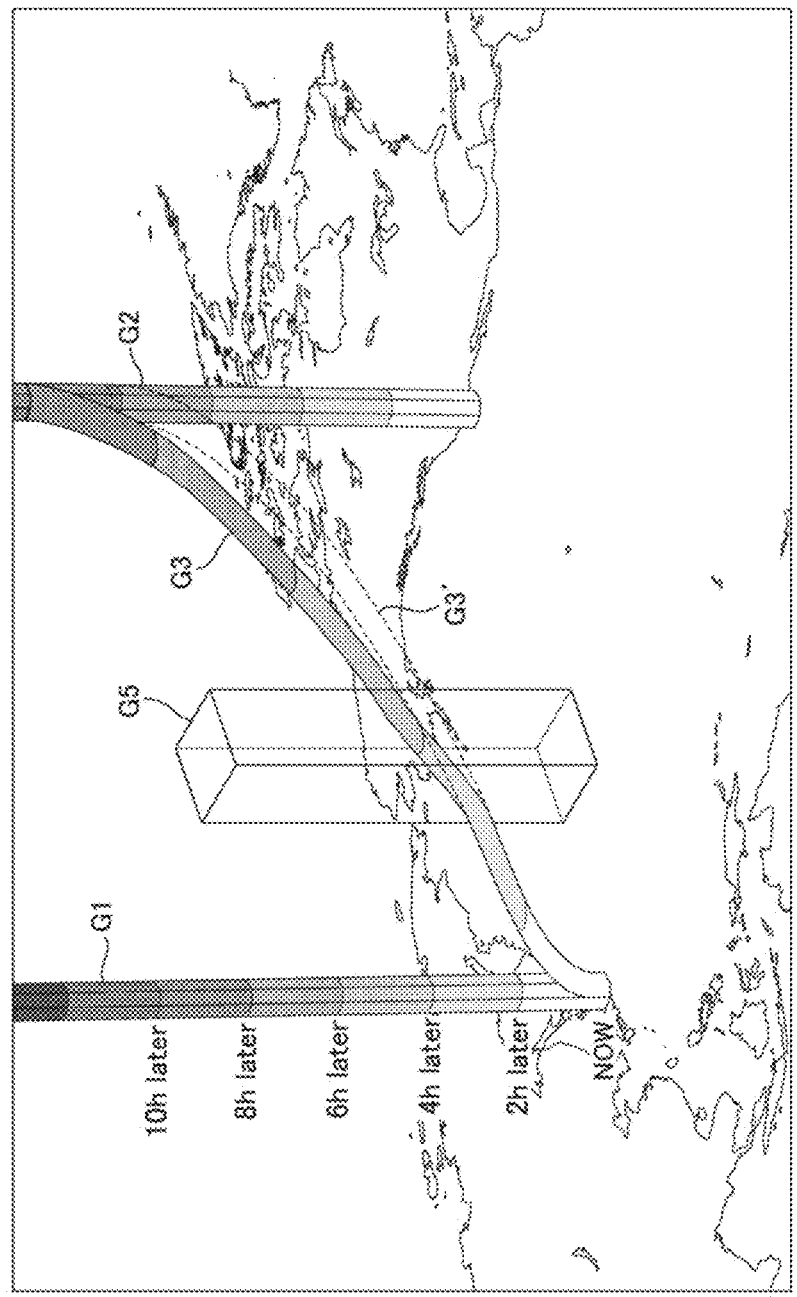
FIG. 11 is a diagram illustrating an example of a three-dimensional graph displayed in accordance with the third exemplary embodiment.

FIG. 11 is a diagram illustrating an example of a three-dimensional graph shown in the third exemplary embodiment. In the example illustrated in FIG. 11, a graphical element G5 corresponding to event data indicating a weather element is further shown in addition to the graphical elements G1, G2, and G3 illustrated in each of the exemplary embodiments described above. The weather element shown as the graphical element G5 is an element that is predicted to exist in a geographical area illustrated in FIG. 11 for approximately nine hours since a certain reference time (NOW in FIG. 11).

Furthermore, there exists a portion where the geographical area of the weather element indicated by the graphical element G5 overlaps with the flight route (geographical location) of an aircraft flight indicated by the graphical element G3, and the slope of the graphical element G3 is increased in the overlapping portion. This is because the flight speed of the aircraft flight is expected to decrease due to this weather element, and hence it is indicated that the estimated data corresponding to the graphical element G3 is corrected according to the flight speed. Note that G3' shown as a dotted line corresponds to estimated data before correction is made according to the weather element. In the example illustrated in FIG. 11, the graphical element G5 corresponding to the event data is shown as a quadrangular prism. However, the graphical element G5 may be shown as a figure representing the weather element (for example, cloud or typhoon).

Figure 12:
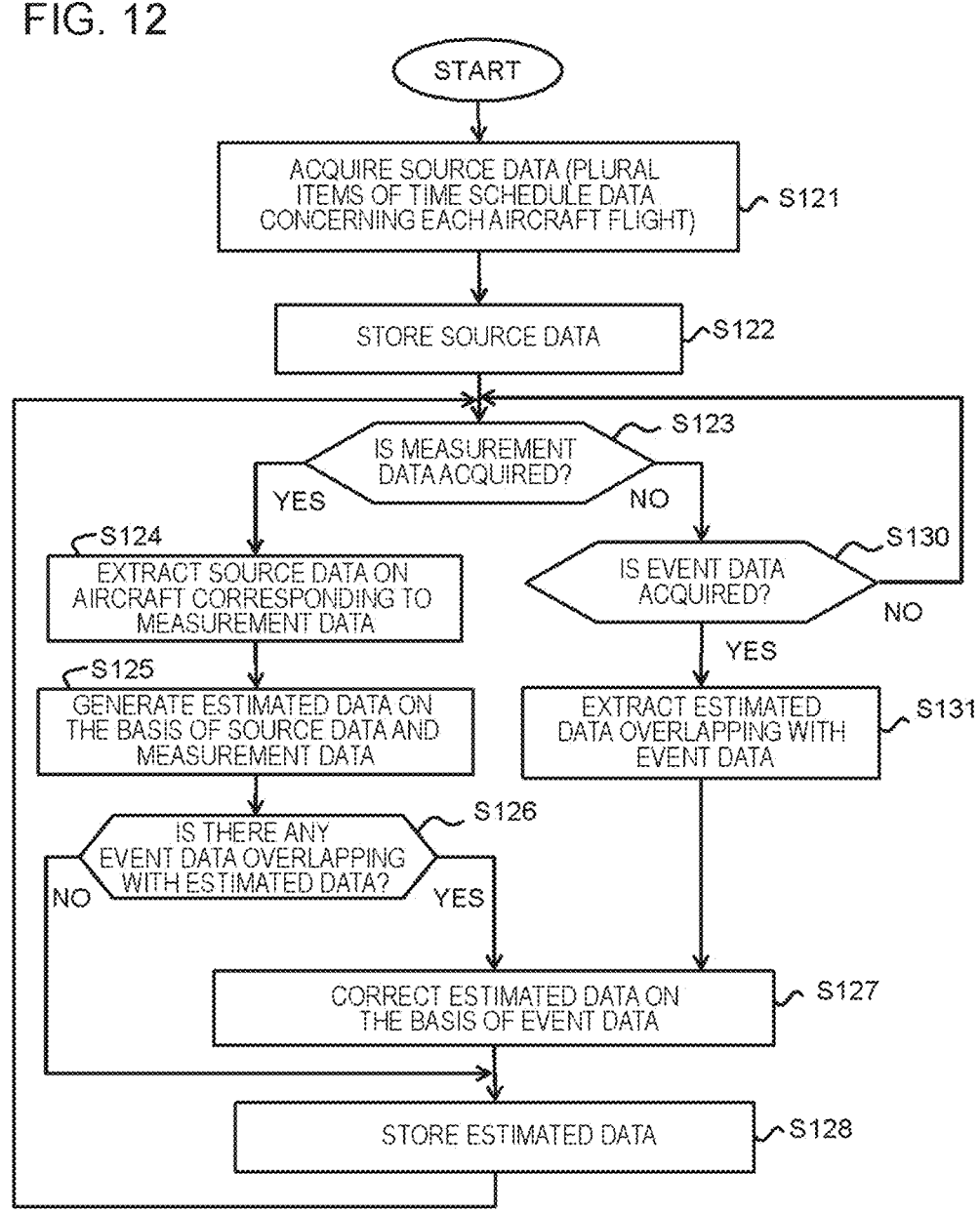
FIG. 12 is a flowchart showing an example of operations performed by the air-traffic control supporting device according to the third exemplary embodiment in connection with generation of target data (estimated data) serving as a basis for a three-dimensional graph.

FIG. 12 is a flowchart showing an example of operations performed by the supporting device 10 according to the third exemplary embodiment in connection with generation of the target data (estimated data) serving as a basis for a three-dimensional graph. Steps S121 to S125 are similar to steps S71 and S75 in FIG. 7, and hence, explanation thereof will not be repeated.

On the basis of the extracted source data and the acquired measurement data, the supporting device 10 generates estimated data on an aircraft corresponding to the measurement data (S125), and then, judges whether any event data overlapping with the estimated data is stored in the event-data storage unit 32 (S126). If the event data overlapping with the estimated data is stored (S126; YES), the supporting device 10 corrects the estimated data overlapping with the event data as well as estimated data having a time on and after the time indicated by the estimated data on the basis of the event data (S127). The meaning of this correction of the estimated data is the same as the meaning of generation of estimated data on the basis of measurement data, source data, and event data.

The supporting device 10 stores the estimated data corrected as described above, in the estimated-data storage unit 25 (S128). On the other hand, if no event data overlapping with the estimated data is stored (S126; NO), the supporting device 10 stores the estimated data in the estimated-data storage unit 25 as it is without applying any processing (S128).

If no measurement data is acquired (S123; NO), the supporting device 10 further judges whether any event data is acquired (S130). In other words, the supporting device 10 waits until at least one of the measurement data and the event data is acquired.

If the measurement data is not acquired (S123; NO), and the event data is acquire (S130; YES), the supporting device 10 extracts estimated data overlapping with the acquired event data from the estimated-data storage unit 25 (S131). The supporting device 10 corrects the extracted estimated data on the basis of the event data as described above (S127), and stores the corrected estimated data in the estimated-data storage unit 25 (S128).

[Operation and Effect of Third Exemplary Embodiment]

In the third exemplary embodiment, plural items of event data indicating a weather element occurring in a given geological area for a given period of time are acquired, and in connection with this weather element, a correspondent relationship between a differential time from a reference time (which is the same as the reference time used in connection with the target data) and a geographical area associated with the differential time is further displayed in addition to information concerning each aircraft in a three-dimensional graph. With this configuration, a user can easily recognize a positional relationship and a relationship in terms of time between the flight route of each aircraft flight and a weather element that may affect the flight route. As described above, according to the third exemplary embodiment, it is possible to display data on a weather element that may affect the flight route of an aircraft in an intuitively and easily recognizable manner, in addition to the flight schedule data on the aircraft serving as data that change over time.

Furthermore, in the third exemplary embodiment, for an aircraft having a schedule that positionally and timely overlaps with event data corresponding to the weather element, the flight schedule in the future is corrected on the basis of the flight speed that decreases according to the weather element. As described above, according to the third exemplary embodiment, it is possible to simulate future flight situations of each aircraft flight in a highly precise manner by taking into consideration the weather forecast information that becomes highly precise in association with recent improvement in the weather forecast technologies.

Thus, by generating drawing data having GUI according to the modification example of the second exemplary embodiment, it is possible to flexibly create a flight schedule that avoids a weather element in terms of time or geographical location.

[Fourth Exemplary Embodiment]

In a fourth exemplary embodiment, colors of graphical elements are determined according to the degree of proximity in terms of time and position between aircraft flights and between an aircraft and a weather element. Below, the supporting device 10 according to the fourth exemplary embodiment will be described with focus being placed on things different from the first exemplary embodiment to the third exemplary embodiment. In the following description, explanation of details similar to those in the first exemplary embodiment to the third exemplary embodiment will not be repeated.

Figure 13:
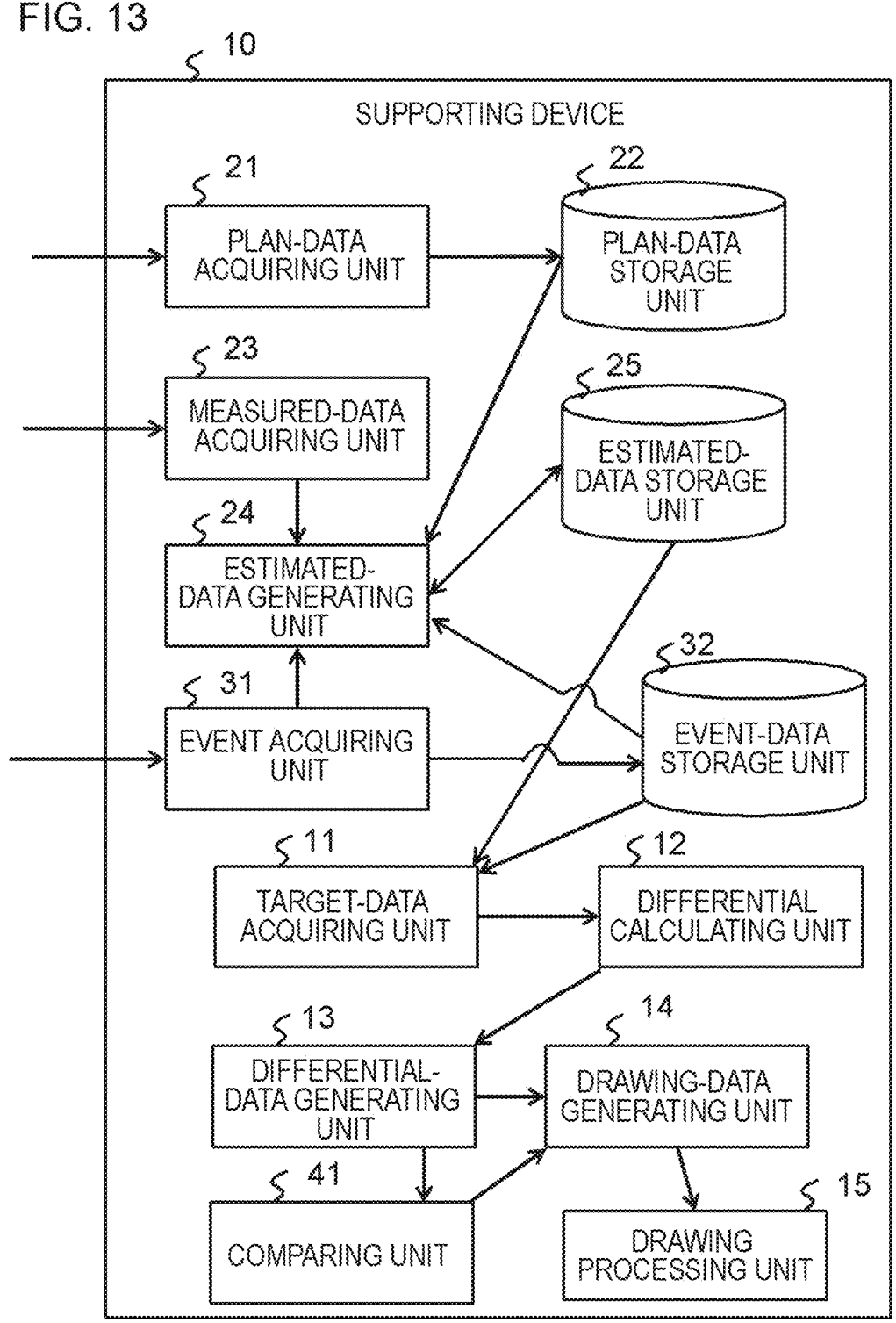
FIG. 13 is a diagram schematically illustrating an example of a process configuration of an air-traffic control supporting device according to a fourth exemplary embodiment.

FIG. 13 is a diagram schematically illustrating an example of a process configuration of the supporting device 10 according to the fourth exemplary embodiment. In addition to the configuration of the third exemplary embodiment, the supporting device 10 according to the fourth exemplary embodiment further includes a comparing unit 41. The comparing unit 41 is realized, for example, with the CPU 2 performing a program stored in the memory 3.

The comparing unit 41 calculates at least one of a distance between location data at a certain differential time of plural items of differential target data and location data at a certain differential time of plural items of differential event data, and a time difference between a differential time at a certain location of plural items of differential target data and a differential time at a certain location of plural items of differential event data. Furthermore, the comparing unit 41 calculates at least one of a distance between location data at a certain differential time of plural items of differential target data concerning a certain aircraft and location data at a certain differential time of plural items of differential target data concerning another aircraft, and a time difference between a differential time at a certain location of plural items of differential target data concerning a certain aircraft and a differential time at a certain location of plural items of differential event data concerning another aircraft.

The drawing-data generating unit 14 generates drawing data on a three-dimensional graph in which drawing elements (graphical elements) connecting three-dimensional coordinate data of the differential target data are color-corded in a stepwise manner according at least one of the distance and the time difference calculated by the comparing unit 41. Furthermore, the drawing-data generating unit 14 generates drawing data on a three-dimensional graph in which drawing elements (graphical elements) connecting three-dimensional coordinate data of the differential target data concerning at least one of a certain aircraft and another aircraft are color-coded in a stepwise manner according to at least one of the distance and the time difference calculated by the comparing unit 41. Note that this exemplary embodiment does not limit the width of and the number of colors of the drawing elements.

Figure 14B:
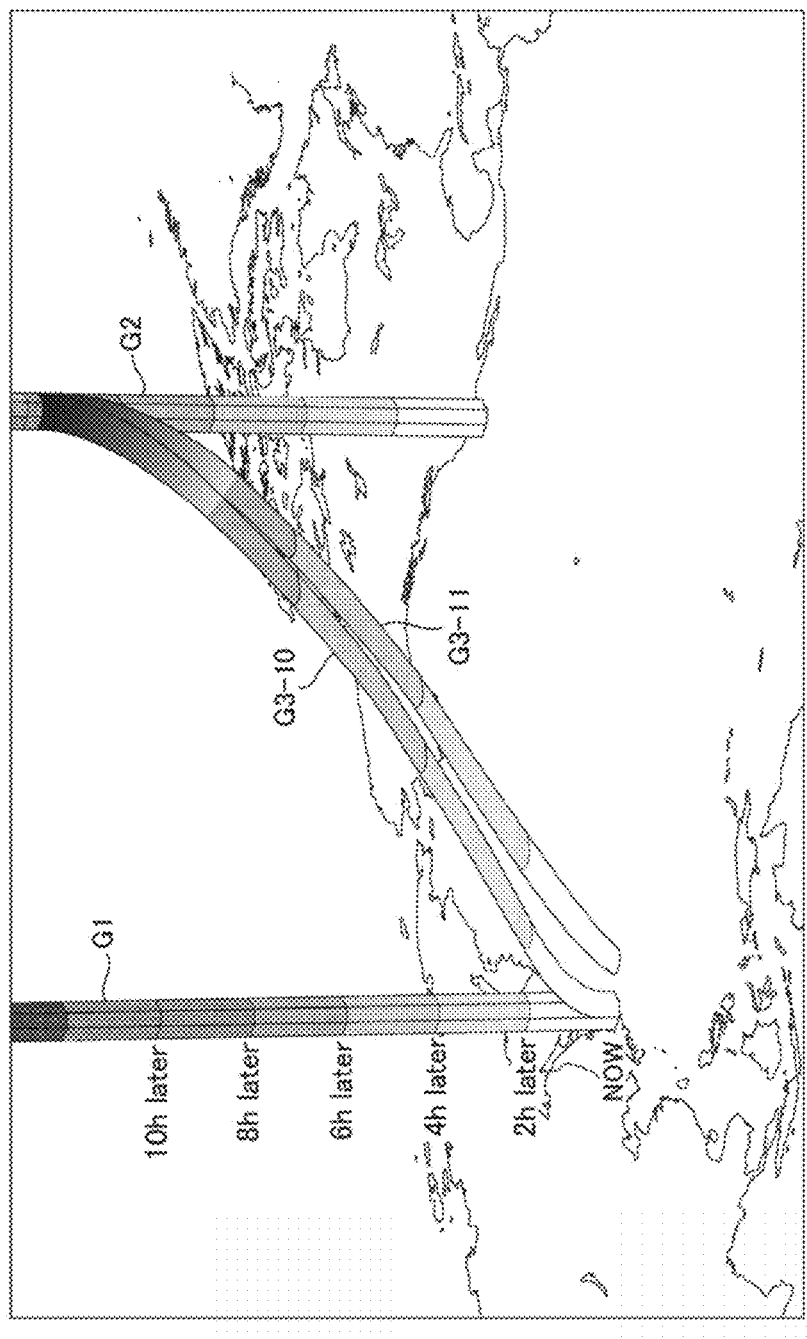
FIG. 14B is a diagram illustrating an example of a three-dimensional graph displayed in accordance with the fourth exemplary embodiment.

FIG. 14A and FIG. 14B are diagrams illustrating examples of the three-dimensional graph shown in accordance with the fourth exemplary embodiment. In the example illustrated in FIG. 14A, colors in the graphical element G3 are displayed in a gradational manner according to the degree of proximity in time or distance between the graphical element G5 corresponding to the weather element and the graphical element G3 showing the flight schedule of an aircraft. In FIG. 14A, in the graphical element G3 showing the aircraft, darker colors are used to show portions overlapping with the graphical element G5 representing the weather element, and colors become thinner in a stepwise manner with distance from the graphical element G5.

Furthermore, in the example illustrated in FIG. 14B, colors in the graphical element G3 are displayed in a gradational manner according to the degree of proximity in time or distance between a graphical element G3-10 showing the flight schedule of a certain aircraft and a graphical element G3-11 showing the flight schedule of another aircraft. In the graphical element G3-1 and the graphical element G3-2 in FIG. 14B, a portion where they are most proximate to each other (portion where they are brought into contact with the graphical element G2) is shown in the darkest color, and colors become thinner in a stepwise manner with an increase in distance between them. This gradational display can remind a user of, for example, an image in which colored liquid, which is dropped on a ribbon (corresponding, for example, to the graphical elements G3, G3-10, and G3-11), gradually soaks in with distance from the dropped portion. With this configuration, it is possible to notify the degree of proximity in an intuitive manner.

[Operation and Effect of Fourth Exemplary Embodiment]

In the fourth exemplary embodiment, time or distance between the event data indicating a weather element and target data indicating the flight schedule of an aircraft, and time or distance between target data concerning each aircraft are calculated, and a three-dimensional graph color-coded according to the proximity (degree of proximity) is displayed. Thus, according to the fourth exemplary embodiment, it is possible to display the degree of proximity between aircrafts, and the degree of proximity of an aircraft to a specific weather element, in an intuitively and easily recognizable manner.

[Modification Example]

In each of the exemplary embodiments described above, estimated data is generated using measurement data on an aircraft, event data indicating a weather element, and/or other data. However, it may be possible to generate the estimated data using data inputted by a user. In such a case, the drawing-data generating unit 14 generates drawing data having a graphical user interface (GUI) that enables user operation for moving or deforming the graphical element G3 (see, for example, FIG. 3) in a three-dimensional graph. The estimated-data generating unit 24 acquires data obtained through the GUI as input data, and generates the estimated data on the basis of the input data.

With this configuration, a user can simulate, for example, the flight route and the speed of each aircraft flight as needed while referring to information in the future displayed as a three-dimensional graph. As a result, it is possible to meet the request made by air carriers to freely select the flight route of each aircraft such as a less swaying route, a more fuel efficient route, and a less risky route, and at the same time, it is possible for an air traffic controller to easily perform traffic control to each aircraft that freely selects the flight route as described above.

In each of the exemplary embodiments described above, the air-traffic control supporting device has been given as an example. However, each of the configurations of the exemplary embodiments described above can be applied to various technical fields that treat location data that changes over time. For example, each of the configurations described above can be applied to a navigation system provided to automobiles such as a private cars and commercial cars, or ships. In this case, for example, time schedule data (sailing route data) from a departure point to the destination is acquired as source data acquired by the plan-data acquiring unit 21. Furthermore, data indicating a specific event such as traffic congestion, traffic accident, and road work is acquired as event data acquired by the event acquiring unit 31.

FIG. 15 is a diagram illustrating an example of application of each of the exemplary embodiments described above to a navigation system for automobiles. In the example illustrated in FIG. 15, a route G15-1 by way of the Shin-Tomei Expressway from a departure point (Tokyo) to a destination (Nagoya) and a route G15-2 by way of the Tomei Expressway are shown. Furthermore, differential event data G15-3 with traffic congestion expected to occur during a certain period of time in a certain section on the Shin-Tomei Expressway is shown. In addition, it is shown that the route by way of the Shin-Tomei Expressway overlaps with the traffic congestion G15-3. With this configuration, in the example in FIG. 15, it is shown that arrival time to Nagoya through the route G15-1 that passes through the Shin-Tomei Expressway is later than that through the route G15-2 that passes through the Tomei Expressway due to the event of the traffic congestion G15-3, although arrival time to Nagoya through the route G15-1 should be earlier than that through the route G15-2 that passes through the Tomei Expressway under normal circumstances. At the destination on the graph, the route G15-2 is located in the lower portion on the paper than the route G15-1. As described above, with each of the exemplary embodiments, by applying to navigation systems for automobiles, it is possible to allow a user to intuitively recognize a relationship between each route and arrival time, and a relationship between each route and an event such as traffic congestion.

The three-dimensional graph displayed in each of the exemplary embodiments described above is not limited to each of the examples described above. In, for example, FIG. 3, plural items of three-dimensional coordinate data forming the three-dimensional graph are displayed as the ribbon graphical element G3 in which adjacent data are smoothly connected to each other. However, it may be possible to employ a configuration in which each coordinate point is expressed as a spherical graphical element, and these coordinate points are connected with line segments. In this case, in FIG. 14A and FIG. 14B, it is only necessary to control colors of these line segments. As described above, in each of the exemplary embodiments, graphical elements expressing the three-dimensional coordinate data are not limited.

In the plural flowcharts used in the descriptions above, plural steps are described in a sequential order. However, the order of the steps performed in this exemplary embodiment is not limited to the order of the steps described. In this exemplary embodiment, the order of the steps illustrated in the drawing may be exchanged, provided that the exchange does not impair the details of the processes. Furthermore, the exemplary embodiments and modification examples described above may be combined as long as details thereof do not contradict each other.

Part or all of the exemplary embodiments and the modification examples described above can be specified in a manner illustrated in the Supplementary Notes described below. However, the exemplary embodiments and the modification examples are not limited to the descriptions below.

(Supplemental Note 1)

A graph drawing device including:

a target-data acquiring unit that acquires plural items of target data each containing time data and two-dimensional data in two specific dimensions other than time;

a differential calculating unit that calculates a differential time between the time data and a reference time concerning each of the target data acquired by the target-data acquiring unit;

a differential-data generating unit that generates plural items of differential target data each obtained by replacing the time data contained in each of the target data with the differential time calculated by the differential calculating unit; and a drawing-data generating unit that converts each of the differential target data generated by the differential-data generating unit into three-dimensional coordinate data in a three-dimensional coordinate system formed by a time axis and a coordinate plane formed by the two specific dimensions, and generates drawing data on a three-dimensional graph showing plural items of the three-dimensional coordinate data converted.

(Supplemental Note 2)

The graph drawing device according to Supplemental Note 1, in which at each drawing update time, which sequentially comes at a given timing, the differential calculating unit sets the reference time to be a point in time of the drawing update time, and then, sequentially calculates a differential time of each of the target data, the differential-data generating unit sequentially generates the plural items of differential target data using the differential time sequentially calculated by the differential calculating unit, and the drawing-data generating unit generates drawing data that changes the three-dimensional graph, on the basis of the plural items of differential target data generated by the differential-data generating unit and the reference time set to be the point in time of the drawing update time.

(Supplemental Note 3)

The graph drawing device according to Supplemental Note 1 or 2, further including:

a source-data acquiring unit that acquires plural items of source data serving as a basis for the plural items of target data acquired by the target-data acquiring unit;

a measured-data acquiring unit that acquires measured location data indicating a geographical location of an object to be moved and measurement time data corresponding to a time when the measured location data has been measured; and an estimated-data generating unit that generates plural items of estimated data each containing time data and location data indicating a geographical location using the plural items of source data acquired by the source-data acquiring unit, the measured location data, and the measurement time data, in which the target-data acquiring unit acquires the plural items of estimated data generated by the estimated-data generating unit, as the plural items of target data.

(Supplemental Note 4)

The graph drawing device according to Supplemental Note 3, in which the estimated-data generating unit calculates at least one speed on the basis of the plural items of source data, and generates the plural items of estimated data so that the at least one speed is maintained with reference to the measured location data and the measurement time data.

(Supplemental Note 5)

The graph drawing device according to Supplemental Note 3, in which the estimated-data generating unit calculates a speed on the basis of histories of the measured location data and the measurement time data, and generates the plural items of estimated data so that the speed is maintained with reference to the measured location data and the measurement time data.

(Supplemental Note 6)

The graph drawing device according to any one of Supplemental Notes 1 to 5, further including:

an event acquiring unit that acquires plural items of event data each indicating a specific event occurring at a given geographical location from a given occurrence time for a given period of time, and each containing time data indicating a point in time within the given period of time and location data indicating a location at which the specific event occurs, in which the differential calculating unit further calculates a differential time between the time data and the reference time in connection with each of the event data, the differential-data generating unit further generates plural items of differential event data obtained by replacing the time data contained in each of the event data with the differential time calculated by the differential calculating unit, and the drawing-data generating unit converts each of the differential event data into three-dimensional coordinate data in the three-dimensional coordinate system, and generates drawing data on the three-dimensional graph further showing plural items of the three-dimensional coordinate data that are converted from the plural items of differential event data.

(Supplemental Note 7)

The graph drawing device according to Supplemental Note 6, further including:

a source-data acquiring unit that acquires plural items of source data serving as a basis for the plural items of target data acquired by the target-data acquiring unit; and an estimated-data generating unit that generates plural items of estimated data each containing time data and location data indicating a geographical location using the plural items of source data acquired by the source-data acquiring unit and the plural items of event data acquired by the event acquiring unit, in which the target-data acquiring unit acquires the plural items of estimated data generated by the estimated-data generating unit as the plural items of target data.

(Supplemental Note 8)

The graph drawing device according to Supplemental Note 6 or 7, further including:

a comparing unit that calculates at least one of a distance between location data at a certain differential time of the plural items of differential target data and location data at a certain differential time of the plural items of differential event data, and a time difference between a differential time at a certain location of the plural items of differential target data and a differential time at a certain location of the plural items of differential event data, in which the drawing-data generating unit generates drawing data on the three-dimensional graph in which a drawing element connecting between three-dimensional coordinate data of the differential target data is colored in a stepwise manner according at least one of the distance and the time difference.

(Supplemental Note 9)

The graph drawing device according to any one of Supplemental Notes 6 to 8, in which the target-data acquiring unit acquires the plural items of target data for each of a first object to be moved and a second object to be moved, the graph drawing device further includes:

a comparing unit that calculates at least one of a distance between location data at a certain differential time of the plural items of differential target data concerning the first object to be moved and location data at a certain differential time of the plural items of differential target data concerning the second object to be moved, and a time difference between a differential time at a certain location of the plural items of differential target data concerning the first object to be moved and a differential time at a certain location of the plural items of differential event data concerning the second object to be moved, and the drawing-data generating unit generates drawing data on the three-dimensional graph in which a drawing element connecting between three-dimensional coordinate data of the differential target data concerning at least one of the first object to be moved and the second object to be moved is colored in a stepwise manner according at least one of the distance and the time difference.

(Supplemental Note 10)

A graph drawing method performed by at least one computer, including:

acquiring plural items of target data each containing time data and two-dimensional data in two specific dimensions other than time;

calculating a differential time between the time data and a reference time concerning each of the target data;

generating plural items of differential target data each obtained by replacing the time data contained in each of the target data with the differential time;

converting each of the differential target data into three-dimensional coordinate data in a three-dimensional coordinate system formed by a time axis and a coordinate plane formed by the two specific dimensions; and generating drawing data on a three-dimensional graph showing plural items of the three-dimensional coordinate data converted.

(Supplemental Note 11)

The graph drawing method according to Supplemental Note 10, in which the calculating the differential time includes, at each drawing update time, which sequentially comes at a given timing, setting the reference time to be a point in time of the drawing update time, and then, sequentially calculating a differential time of each of the target data, the generating the differential target data includes sequentially generating the plural items of differential target data using the differential time sequentially calculated, and the generating the drawing data includes generating drawing data that changes the three-dimensional graph, on the basis of the plural items of differential target data generated and the reference time set to be the point in time of the drawing update time.

(Supplemental Note 12)

The graph drawing method according to Supplemental Note 10 or 11, further including:

acquiring plural items of source data serving as a basis for the plural items of target data;

acquiring measured location data indicating a geographical location of an object to be moved and measurement time data corresponding to a time when the measured location data has been measured; and generating plural items of estimated data each containing time data and location data indicating a geographical location, using the plural items of source data, the measured location data, and the measurement time data, in which the acquiring the target data includes acquiring the plural items of estimated data as the plural items of target data.

(Supplemental Note 13)

The graph drawing method according to Supplemental Note 12, in which the generating the estimated data includes:
    calculating at least one speed on the basis of the plural items of source data; and
    generating the plural items of estimated data so that the at least one speed is maintained with reference to the measured location data and the measurement time data.

(Supplemental Note 14)

The graph drawing method according to Supplemental Note 12, in which the generating the estimated data includes:
    calculating a speed on the basis of histories of the measured location data and the measurement time data; and
    generating the plural items of estimated data so that the speed is maintained with reference to the measured location data and the measurement time data.

(Supplemental Note 15)

The graph drawing method according to any one of Supplemental Notes 10 to 14, further including:

acquiring plural items of event data each indicating a specific event occurring at a given geographical location from a given occurrence time for a given period of time, and each containing time data indicating a point in time within the given period of time and location data indicating a location at which the specific event occurs, in which the calculating the differential time includes calculating a differential time between the time data and the reference time in connection with each of the event data, the generating the differential target data includes generating plural items of differential event data obtained by replacing the time data contained in each of the event data with the differential time, and the generating the drawing data includes converting each of the differential event data into three-dimensional coordinate data in the three-dimensional coordinate system, and generating drawing data on the three-dimensional graph further showing plural items of the three-dimensional coordinate data that are converted from the plural items of differential event data.

(Supplemental Note 16)

The graph drawing method according to Supplemental Note 15, further including:

acquiring plural items of source data serving as a basis for the plural items of target data; and generating plural items of estimated data each containing time data and location data indicating a geographical location using the plural items of source data and the plural items of event data, in which the acquiring the target data includes acquiring the plural items of estimated data as the plural items of target data.

(Supplemental Note 17)

The graph drawing method according to Supplemental Note 15 or 16, further including:

calculating at least one of a distance between location data at a certain differential time of the plural items of differential target data and location data at a certain differential time of the plural items of differential event data, and a time difference between a differential time at a certain location of the plural items of differential target data and a differential time at a certain location of the plural items of differential event data, in which the generating the drawing data includes generating drawing data on the three-dimensional graph in which a drawing element connecting between three-dimensional coordinate data of the differential target data is colored in a stepwise manner according at least one of the distance and the time difference.

(Supplemental Note 18)

The graph drawing method according to any one of Supplemental Notes 15 to 17, in which
    the acquiring the target data includes acquiring the plural items of target data for each of a first object to be moved and a second object to be moved,
    the graph drawing method further includes:
        calculating at least one of a distance between location data at a certain differential time of the plural items of differential target data concerning the first object to be moved and location data at a certain differential time of the plural items of differential target data concerning the second object to be moved, and a time difference between a differential time at a certain location of the plural items of differential target data concerning the first object to be moved and a differential time at a certain location of the plural items of differential event data concerning the second object to be moved, and
    the generating the drawing data includes generating drawing data on the three-dimensional graph in which a drawing element connecting between three-dimensional coordinate data of the differential target data concerning at least one of the first object to be moved and the second object to be moved is colored in a stepwise manner according at least one of the distance and the time difference.

(Supplemental Note 19)

A program that causes at least one computer to perform the graph drawing method according to any one of Supplemental Notes 10 to 18.

(Supplemental Note 20)

A computer-readable storage medium that stores the program according to Supplemental Note 19.

The present application claims priority based on Japanese Patent Application No. 2012-179698 filed on Aug. 14, 2012, the disclosures of which are incorporated herein by reference in their entirety.

What is claimed is:

1. A graph drawing device, comprising:
a target-data acquiring unit implemented by hardware, including a processor and memory, and that acquires a plurality of items of target data each containing time data and two-dimensional data in two specific dimensions other than time;
a differential calculating unit implemented by the hardware and that calculates a differential time between the time data and a reference time concerning each of the target data acquired by the target-data acquiring unit;
a differential-data generating unit implemented by the hardware and that generates a plurality of items of differential target data each obtained by replacing the time data contained in each of the target data with the differential time calculated by the differential calculating unit;
a drawing-data generating unit implemented by the hardware and that converts each of the differential target data generated by the differential-data generating unit into three-dimensional coordinate data in a three-dimensional coordinate system formed by a time axis and a coordinate plane formed by the two specific dimensions, and generates drawing data on a three-dimensional graph showing a plurality of items of the three-dimensional coordinate data converted;
a source-data acquiring unit implemented by the hardware and that acquires a plurality of items of source data serving as a basis for the plurality of items of target data acquired by the target-data acquiring unit;
a measured-data acquiring unit implemented by the hardware and that acquires measured location data indicating a geographical location of an object to be moved and measurement time data corresponding to a time when the measured location data has been measured; and
an estimated-data generating unit implemented by the hardware and that generates a plurality of items of estimated data each containing time data and location data indicating a geographical location, using the plurality of items of source data acquired by the source-data acquiring unit, the measured location data, and the measurement time data,
wherein the target-data acquiring unit acquires the plurality of items of estimated data generated by the estimated-data generating unit, as the plurality of items of target data.

2. The graph drawing device according to claim 1, wherein
at each drawing update time, which sequentially comes at a given timing, the differential calculating unit sets the reference time to be a point in time of the drawing update time, and then, sequentially calculates a differential time of each of the target data,
the differential-data generating unit sequentially generates the plurality of items of differential target data using the differential time sequentially calculated by the differential calculating unit, and
the drawing-data generating unit generates drawing data that changes the three-dimensional graph, on the basis of the plurality of items of differential target data generated by the differential-data generating unit and the reference time set to be the point in time of the drawing update time.

3. The graph drawing device according to claim 1, wherein
the estimated-data generating unit calculates at least one speed on the basis of the plurality of items of source data, and generates the plurality of items of estimated data so that the at least one speed is maintained with reference to the measured location data and the measurement time data.

4. The graph drawing device according to claim 1, wherein
the estimated-data generating unit calculates a speed on the basis of histories of the measured location data and the measurement time data, and generates the plurality of items of estimated data so that the speed is maintained with reference to the measured location data and the measurement time data.

5. The graph drawing device according to claim 1, further comprising:
an event acquiring unit implemented by the hardware and that acquires a plurality of items of event data each indicating a specific event occurring at a given geographical location from a given occurrence time for a given period of time, and each containing time data indicating a point in time within the given period of time and location data indicating a location at which the specific event occurs, wherein the differential calculating unit further calculates a differential time between the time data and the reference time in connection with each of the event data,
the differential-data generating unit further generates a plurality of items of differential event data obtained by replacing the time data contained in each of the event data with the differential time calculated by the differential calculating unit, and
the drawing-data generating unit converts each of the differential event data into three-dimensional coordinate data in the three-dimensional coordinate system, and generates drawing data on the three-dimensional graph further showing a plurality of items of the three-dimensional coordinate data that are converted from the plurality of items of differential event data.

6. The graph drawing device according to claim 5, further including:
a source-data acquiring unit implemented by the hardware and that acquires a plurality of items of source data serving as a basis for the plurality of items of target data acquired by the target-data acquiring unit; and
an estimated-data generating unit that generates a plurality of items of estimated data each containing time data and location data indicating a geographical location using the plurality of items of source data acquired by the source-data acquiring unit and the plurality of items of event data acquired by the event acquiring unit, in which
the target-data acquiring unit acquires the plurality of items of estimated data generated by the estimated-data generating unit as the plurality of items of target data.

7. The graph drawing device according to claim 5, further comprising:
a comparing unit implemented by the hardware and that calculates at least one of a distance between location data at a certain differential time of the plurality of items of differential target data and location data at a certain differential time of the plurality of items of differential event data, and a time difference between a differential time at a certain location of the plurality of items of differential target data and a differential time at a certain location of the plurality of items of differential event data, wherein the drawing-data generating unit generates drawing data on the three-dimensional graph in which a drawing element connecting between three-dimensional coordinate data of the differential target data is colored in a stepwise manner according at least one of the distance and the time difference.

8. The graph drawing device according to claim 5, wherein the target-data acquiring unit acquires the plurality of items of target data for each of a first object to be moved and a second object to be moved, the graph drawing device further comprises a comparing unit implemented by the hardware and that calculates at least one of a distance between location data at a certain differential time of the plurality of items of differential target data concerning the first object to be moved and location data at a certain differential time of the plurality of items of differential target data concerning the second object to be moved, and a time difference between a differential time at a certain location of the plurality of items of differential target data concerning the first object to be moved and a differential time at a certain location of the plurality of items of differential event data concerning the second object to be moved, and the drawing-data generating unit generates drawing data on the three-dimensional graph in which a drawing element connecting between three-dimensional coordinate data of the differential target data concerning at least one of the first object to be moved and the second object to be moved is colored in a stepwise manner according at least one of the distance and the time difference.

9. A graph drawing method, including:

acquiring a plurality of items of target data each containing time data and two-dimensional data in two specific dimensions other than time;

calculating a differential time between the time data and a reference time concerning each of the target data;

generating a plurality of items of differential target data each obtained by replacing the time data contained in each of the target data with the differential time;

converting each of the differential target data into three-dimensional coordinate data in a three-dimensional coordinate system formed by a time axis and a coordinate plane formed by the two specific dimensions;

generating drawing data on a three-dimensional graph showing a plurality of items of the three-dimensional coordinate data converted;

acquiring a plurality of items of source data serving as a basis for the plurality of items of target data;

acquiring measured location data indicating a geographical location of an object to be moved and measurement time data corresponding to a time when the measured location data has been measured; and generating a plurality of items of estimated data each containing time data and location data indicating a geographical location, using the plurality of items of source data, the measured location data, and the measurement time data, wherein the acquiring the target data includes acquiring the plurality of items of estimated data as the plurality of items of target data.

10. The graph drawing method according to claim 9, wherein the calculating the differential time includes, at each drawing update time, which sequentially comes at a given timing, setting the reference time to be a point in time of the drawing update time, and then, sequentially calculating a differential time of each of the target data, the generating the differential target data includes sequentially generating the plurality of items of differential target data using the differential time sequentially calculated, and the generating the drawing data includes generating drawing data that changes the three-dimensional graph, on the basis of the plurality of items of differential target data generated and the reference time set to be the point in time of the drawing update time.

11. The graph drawing method according to claim 9, wherein the generating the estimated data includes:

calculating at least one speed on the basis of the plurality of items of source data; and generating the plurality of items of estimated data so that the at least one speed is maintained with reference to the measured location data and the measurement time data.

12. The graph drawing method according to claim 9, wherein the generating the estimated data includes:

calculating a speed on the basis of histories of the measured location data and the measurement time data; and generating the plurality of items of estimated data so that the speed is maintained with reference to the measured location data and the measurement time data.

13. The graph drawing method according to claim 9, further including:

acquiring a plurality of items of event data each indicating a specific event occurring at a given geographical location from a given occurrence time for a given period of time, and each containing time data indicating a point in time within the given period of time and location data indicating a location at which the specific event occurs, wherein the calculating the differential time includes calculating a differential time between the time data and the reference time in connection with each of the event data, the generating the differential target data includes generating a plurality of items of differential event data obtained by replacing the time data contained in each of the event data with the differential time, and the generating the drawing data includes converting each of the differential event data into three-dimensional coordinate data in the three-dimensional coordinate system, and generating drawing data on the three-dimensional graph further showing a plurality of items of the three-dimensional coordinate data that are converted from the plurality of items of differential event data.

14. The graph drawing method according to claim 13, further including:

acquiring a plurality of items of source data serving as a basis for the plurality of items of target data; and generating a plurality of items of estimated data each containing time data and location data indicating a geographical location using the plurality of items of source data and the plurality of items of event data, wherein the acquiring the target data includes acquiring the plurality of items of estimated data as the plurality of items of target data.

15. The graph drawing method according to claim 13, further including:

calculating at least one of a distance between location data at a certain differential time of the plurality of items of differential target data and location data at a certain differential time of the plurality of items of differential event data, and a time difference between a differential time at a certain location of the plurality of items of differential target data and a differential time at a certain location of the plurality of items of differential event data, wherein the generating the drawing data includes generating drawing data on the three-dimensional graph in which a drawing element connecting between three-dimensional coordinate data of the differential target data is colored in a stepwise manner according at least one of the distance and the time difference.

16. The graph drawing method according to claim 13, wherein the acquiring the target data includes acquiring the plurality of items of target data for each of a first object to be moved and a second object to be moved, the graph drawing method further includes:

calculating at least one of a distance between location data at a certain differential time of the plurality of items of differential target data concerning the first object to be moved and location data at a certain differential time of the plurality of items of differential target data concerning the second object to be moved, and a time difference between a differential time at a certain location of the plurality of items of differential target data concerning the first object to be moved and a differential time at a certain location of the plurality of items of differential event data concerning the second object to be moved, and the generating the drawing data includes generating drawing data on the three-dimensional graph in which a drawing element connecting between three-dimensional coordinate data of the differential target data concerning at least one of the first object to be moved and the second object to be moved is colored in a stepwise manner according at least one of the distance and the time difference.

17. A non-transitory computer-readable storage medium storing a program for causing at least one computer to perform a graph drawing method, the graph drawing method including:

acquiring a plurality of items of target data each containing time data and two-dimensional data in two specific dimensions other than time;

calculating a differential time between the time data and a reference time concerning each of the target data;

generating a plurality of items of differential target data each obtained by replacing the time data contained in each of the target data with the differential time;

converting each of the differential target data into three-dimensional coordinate data in a three-dimensional coordinate system formed by a time axis and a coordinate plane formed by the two specific dimensions;

generating drawing data on a three-dimensional graph showing a plurality of items of the three-dimensional coordinate data converted;

acquiring a plurality of items of source data serving as a basis for the plurality of items of target data;

acquiring measured location data indicating a geographical location of an object to be moved and measurement time data corresponding to a time when the measured location data has been measured; and generating a plurality of items of estimated data each containing time data and location data indicating a geographical location, using the plurality of items of source data, the measured location data, and the measurement time data, wherein the acquiring the target data includes acquiring the plurality of items of estimated data as the plurality of items of target data.

* * * * *